United States Patent
Shimmoto et al.

(10) Patent No.: US 9,016,825 B2
(45) Date of Patent: Apr. 28, 2015

(54) IMAGE PROCESSING APPARATUS, IMAGE PROCESSING METHOD AND IMAGE PRINTING APPARATUS

(71) Applicant: Canon Kabushiki Kaisha, Tokyo (JP)

(72) Inventors: Tatsuo Shimmoto, Tokyo (JP); Masami Izumizaki, Kawasaki (JP); Yoshiyuki Nagase, Kawasaki (JP); Takeshi Oota, Yokohama (JP); Takao Ogata, Tokyo (JP); Noboru Kunimine, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/499,884

(22) Filed: Sep. 29, 2014

(65) Prior Publication Data

US 2015/0091965 A1   Apr. 2, 2015

(30) Foreign Application Priority Data

Oct. 1, 2013   (JP) .................................. 2013-206787

(51) Int. Cl.
*B41J 2/205* (2006.01)
*B41J 2/045* (2006.01)
*B41J 2/21* (2006.01)

(52) U.S. Cl.
CPC ................ *B41J 2/04501* (2013.01); *B41J 2/21* (2013.01)

(58) Field of Classification Search
CPC ........ B41J 2/2135; B41J 11/42; B41J 11/425; B41J 2/36; B41J 2/5056; B41J 2/04593; B41J 2/2121; B41J 3/60; B41J 29/393; B41J 2/145; B41J 2/2054
USPC .................... 347/9–11, 14–16, 19, 43, 57, 60
See application file for complete search history.

(56) References Cited

U.S. PATENT DOCUMENTS

| | | | |
|---|---|---|---|
| 7,869,066 B2 * | 1/2011 | Kuno | 358/1.14 |
| 2007/0097164 A1 | 5/2007 | Marumoto | |
| 2009/0315935 A1 | 12/2009 | Narumi | |
| 2012/0050388 A1 | 3/2012 | Nishiguchi | |
| 2014/0204144 A1 * | 7/2014 | Ishikawa et al. | 347/16 |

* cited by examiner

*Primary Examiner* — Thinh Nguyen

(74) *Attorney, Agent, or Firm* — Canon U.S.A. Inc., IP Division

(57) ABSTRACT

When an image is printed with inks each containing a polymer emulsion and a film forming agent, the ejection of the inks is controlled so that the ink having a relatively low dynamic surface tension forms dots having a higher dot connectivity than the dots formed with the ink having a relatively high dynamic surface tension.

21 Claims, 19 Drawing Sheets

FIG. 9

| INK COMPOSITION | LIFETIME | DYNAMIC SURFACE TENSION |
|---|---|---|
| INK COMPOSITION A | 10 ms | $\gamma_{A,t}$ = 10 ms |
| | ⋮ | ⋮ |
| | 100 ms | $\gamma_{A,t}$ = 100 ms |
| | ⋮ | ⋮ |
| | 1000 ms | $\gamma_{A,t}$ = 1000 ms |
| | ⋮ | ⋮ |
| | 10000 ms | $\gamma_{A,t}$ = 10000 ms |
| | ⋮ | ⋮ |
| INK COMPOSITION B | 10 ms | $\gamma_{B,t}$ = 10 ms |
| | ⋮ | ⋮ |
| | 100 ms | $\gamma_{B,t}$ = 100 ms |
| | ⋮ | ⋮ |
| | 1000 ms | $\gamma_{B,t}$ = 1000 ms |
| | ⋮ | ⋮ |
| | 10000 ms | $\gamma_{B,t}$ = 10000 ms |
| | ⋮ | ⋮ |
| ⋮ | ⋮ | ⋮ |

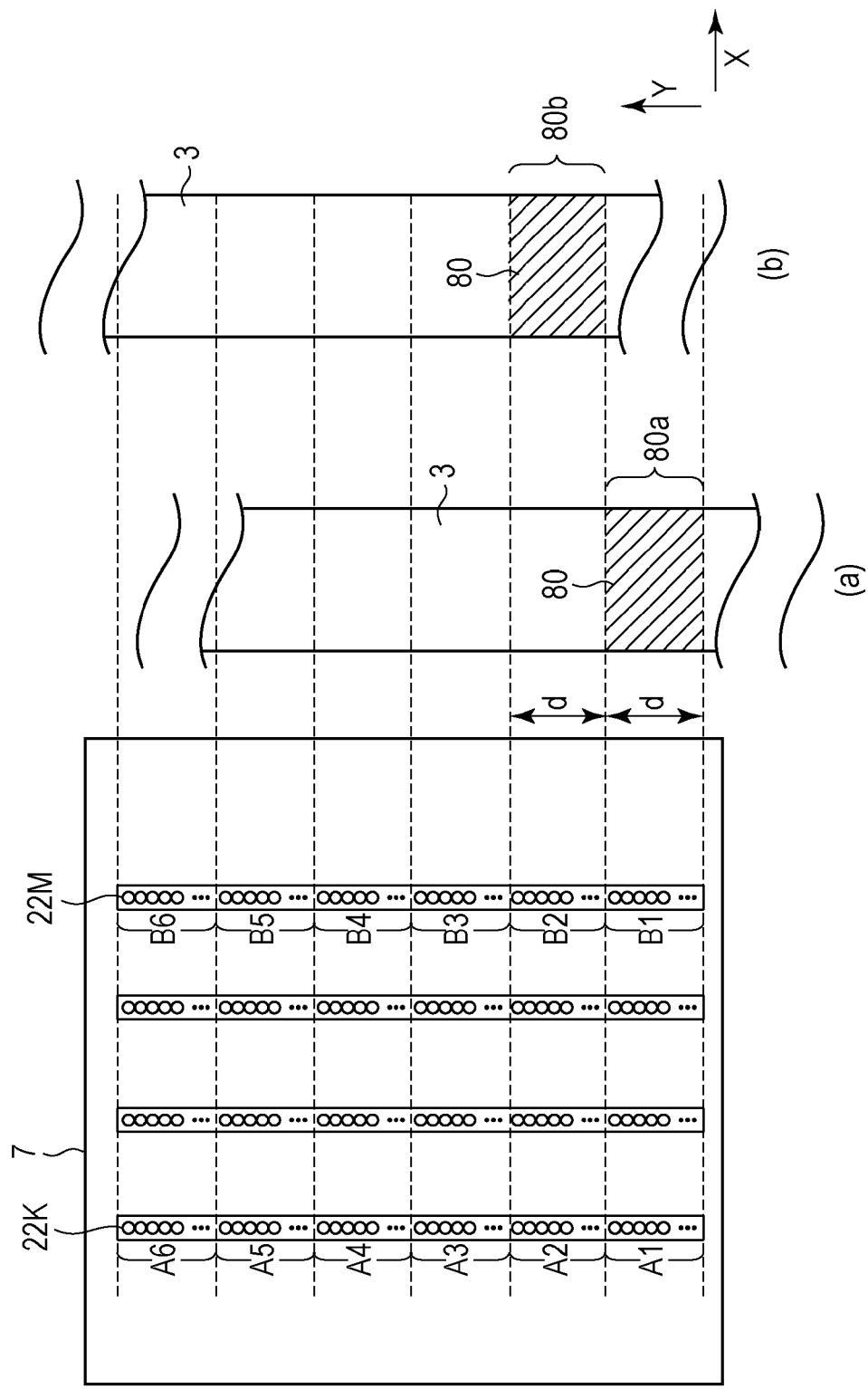

FIG. 15A
FIG. 15B
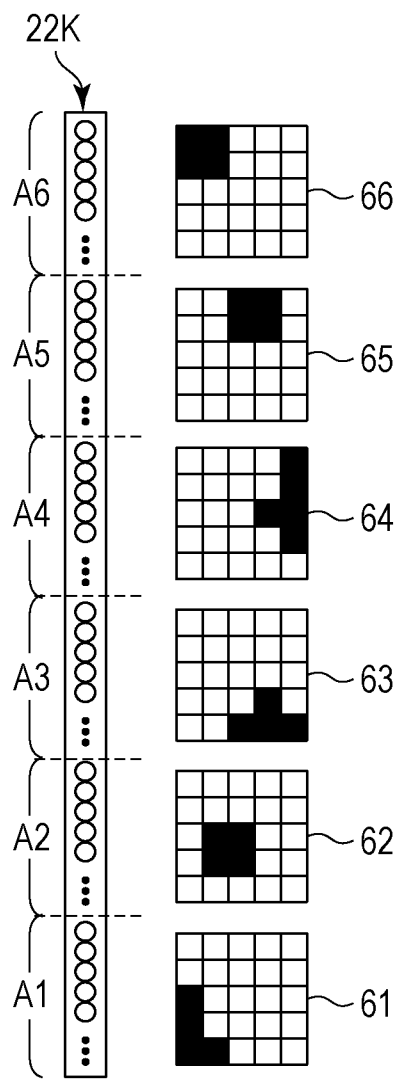
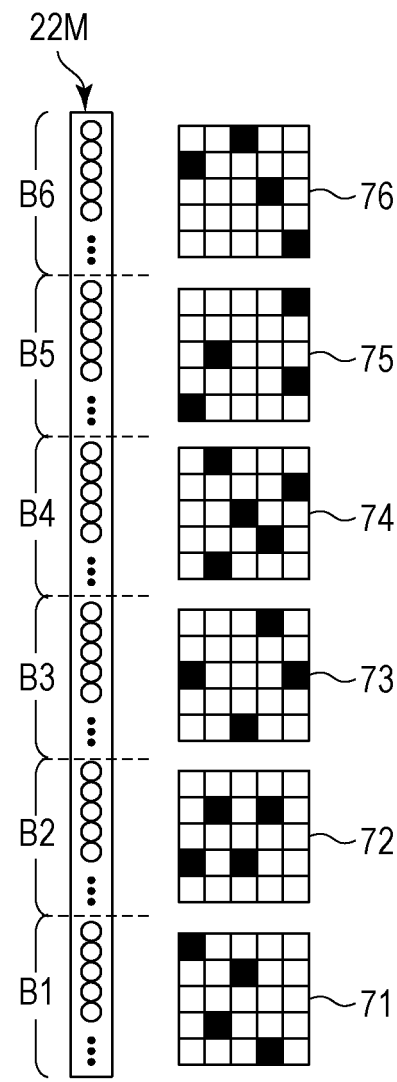
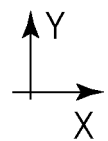

FIG. 17A
FIG. 17B
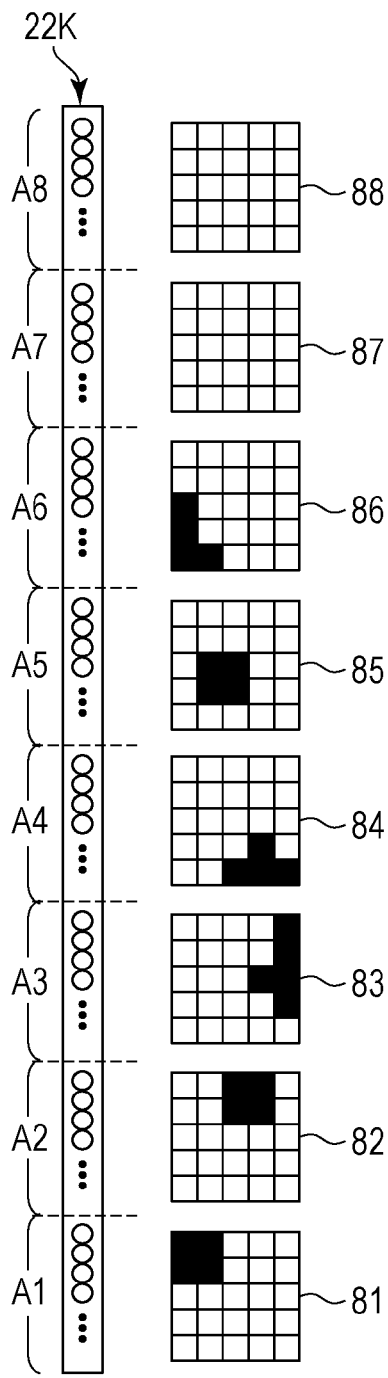
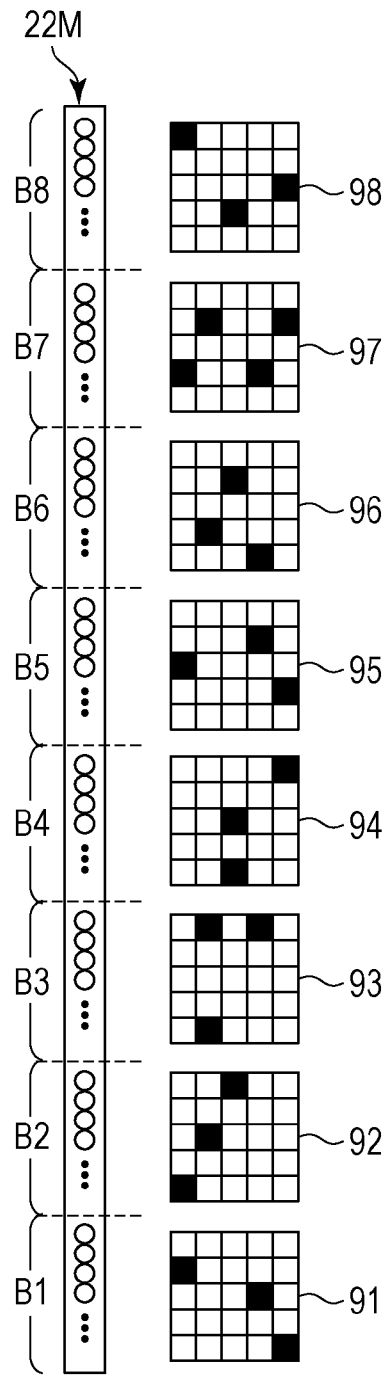
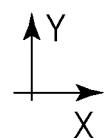

IMAGE PROCESSING APPARATUS, IMAGE PROCESSING METHOD AND IMAGE PRINTING APPARATUS

BACKGROUND OF THE INVENTION

1. Field of the Invention

The present application relates to an image processing apparatus, an image processing method, and an image printing apparatus.

2. Description of the Related Art

An ink jet printing method has been known which forms an image on a printing medium by repeating a sequence of scanning operation for printing (hereinafter referred to as print scanning operation) and sub-scanning operation for conveying the printing medium. For the print scanning operation, a printing head ejects ink through a plurality of ejection openings arranged therein while scanning the printing medium.

In such an ink jet printing method, in general, a plurality of ink droplets are ejected to different positions apart from each other by each scanning operation, from the viewpoint of reducing the graininess of the printed image. US 2007/0097164 discloses a printing method using mask patterns the print permitting pixel patterns of which have less low-frequency components than high-frequency components as mask patterns determining the printing positions in a plurality of scanning operations.

Images printed by this ink jet printing method, unfortunately, can exhibit low rub fastness. US 2009/0315935 discloses a technique for ejecting an ink not containing polymer and an ink containing a polymer in that order for each of a plurality of images on a printing medium. In this technique, the ink containing a polymer forms the uppermost ink layer of each image, so that the degradation of the rub fastness of the image can be minimized.

In recent years, ink jet printing methods have been increasingly used to produce printed articles for various applications, and various types of ink and printing medium have been being used accordingly. US 2012/0050388 discloses a method for fixing an image on a printing medium by using an ink containing a polymer emulsion and a water-soluble organic solvent and a less absorbent printing medium. In this method, the ink dropped on the printing medium is heated so that the polymer emulsion coalesces into a film on the surface of the printing medium, thereby fixing the image.

The present inventors however has found that some of the inks containing a polymer emulsion and a water-soluble organic solvent do not produce images having a desired rub fastness in some cases.

This disadvantage will now be described in detail. FIGS. 1A to 1C show a process of fixing of an ink droplet having a relatively high dynamic surface tension having dropped on a printing medium. FIGS. 2A to 2C show a process of fixing of an ink droplet having a relatively low dynamic surface tension dropped on a printing medium.

The term dynamic surface tension refers to a value of the surface tension of a liquid, varying with time, in a dynamic state immediately after the interface thereof has been formed, and is a surface tension in a very short time.

On being applied on a printing medium, an ink is in a dynamic state. FIG. 1A shows an ink droplet 50 having a relatively high dynamic surface tension immediately after being applied on a printing medium. The ink droplet 50 contains a pigment 52 and a polymer emulsion 53. In this state, the ink droplet 50 is heated to evaporate the solvent 54. The solvent 54 contains a water-soluble organic solvent that functions as a film forming agent to reduce the temperature at which the polymer emulsion 53 starts coalescing into a film (minimum film forming temperature).

FIG. 1B shows the ink droplet 50 when the polymer emulsion 53 starts coalescing into a film. Almost all the water in the solvent 54 has been evaporated at this stage, so that the water-soluble organic solvent 55 accounts for a major part of the solvent.

FIG. 1C shows the ink droplet 50 when it is completely fixed to the printing medium 3 by being further heated until the particles of the polymer emulsion are fused. Since the polymer emulsion has completed coalescing into a film at this stage, the pigment particles 52 are covered with the film of the polymer emulsion, thereby forming a flat ink layer 56.

FIG. 2A shows an ink droplet 51 having a relatively low dynamic surface tension immediately after being applied on a printing medium. Since inks are in a dynamic state immediately after being applied on a printing medium, as described above, an ink having a relatively low dynamic surface tension is more likely to spread over the surface of the printing medium and wet it than inks having higher dynamic surface tensions. Accordingly, the surface area of the ink droplet 51 having a relatively low dynamic surface tension becomes larger than that of the ink droplet 50 having a relatively high dynamic surface tension. Consequently, the solvent 54 in the ink droplet 51 is more rapidly evaporated.

FIG. 2B shows the ink droplet 51 having a relatively low dynamic surface tension after a period of time has elapsed which is equal to the time until the ink droplet 50 having a relatively high dynamic surface tension is brought into the stage shown in FIG. 1B by further heating. Since the solvent 54 of the ink droplet 51 can be rapidly evaporated as described above, almost all the water-soluble organic solvent 55 intended to reduce the minimum film forming temperature of the polymer emulsion 53 in the ink droplet, as well as the water, has been evaporated at the stage of FIG. 2B. Accordingly, by the time when the temperature of the polymer emulsion increases to the same temperature as the temperature at the stage shown in FIG. 1A, almost all the water-soluble organic solvent 55 is lost. The ink droplet 51 at the stage shown in FIG. 2B cannot therefore reach the minimum film forming temperature, and the polymer emulsion 53 cannot start coalescing into a film.

FIG. 2C shows the ink droplet 51 after a period of time has elapsed which is equal to the time until the ink droplet 50 is brought into the stage shown in FIG. 1C by further heating. In an ink having a relatively low dynamic surface tension, the film formation of the polymer emulsion is delayed. Thus, the film 57 of the polymer emulsion of the resulting ink layer is not satisfactory, as shown in FIG. 2C. In the region where such an unsatisfactory film of the polymer emulsion is formed, the rub fastness of the ink layer is so insufficient as the image is much likely to separate from the printing medium if rubbed. As such a region increases in an image on a printing medium, the rub fastness of the image decreases.

SUMMARY OF THE INVENTION

Accordingly, the present application provides an image processing apparatus, an image processing method and an image printing apparatus adapted to print an image in a process in which an ink containing a polymer emulsion and a water-soluble organic solvent and having a relatively low dynamic surface tension is used so as to prevent the decrease in the rub fastness of the resulting image and the increase in graininess of the image.

According to an aspect, an image processing apparatus is provided which generates printing data for a printing head to eject a plurality of inks to a plurality of pixel areas, each corresponding to a pixel, in a unit region on a printing medium by a plurality of relative scanning operations. The plurality of inks include a first color ink containing a pigment, a polymer emulsion and a water-soluble organic solvent, and a second color ink containing a pigment, a polymer emulsion and a water-soluble organic solvent and having a lower dynamic surface tension than the first color ink at a predetermined bubble lifetime. The image processing apparatus includes an image data obtaining unit configured to obtain first image data determining, for each of the pixel areas, whether or not the first color ink is ejected to the pixel area, and second image data determining, for each of the pixel areas, whether or not the second color ink is ejected to the pixel area, and a printing data generator configured to generate a plurality of first printing data, each corresponding to any of the plurality of scanning operations and being used for printing performed by the corresponding scanning operation, from the first image data according to a plurality of first mask patterns in which print permitting pixels and print non-permitting pixels are arranged, and a plurality of second printing data, each corresponding to any of the plurality of scanning operations and being used for printing performed by the corresponding scanning operation, from the second image data according to a plurality of second mask patterns in which print permitting pixels and print non-permitting pixel are arranged. The print permitting pixels in each mask pattern define at least one print permitting pixel unit consisting of a plurality of print permitting pixels adjoining each other or a single print permitting pixel not adjoining other print permitting pixels, and the average number per print permitting pixel unit of the print permitting pixels in each second mask pattern is larger than the average number per print permitting pixel unit of the print permitting pixels in each first mask pattern.

Further features of the present invention will become apparent from the following description of exemplary embodiments with reference to the attached drawings.

BRIEF DESCRIPTION OF THE DRAWINGS

FIG. 9 is a method for storing dynamic surface tension according to an embodiment.

FIG. 12 is a representation of a multipass printing method according to an embodiment.

FIGS. 15A and 15B are schematic diagrams of mask patterns used in an embodiment.

FIGS. 17A and 17B are schematic diagrams of mask patterns used in an embodiment.

DESCRIPTION OF THE EMBODIMENTS

First Embodiment

A first embodiment of the invention will now be described in detail.

Figure 1A:
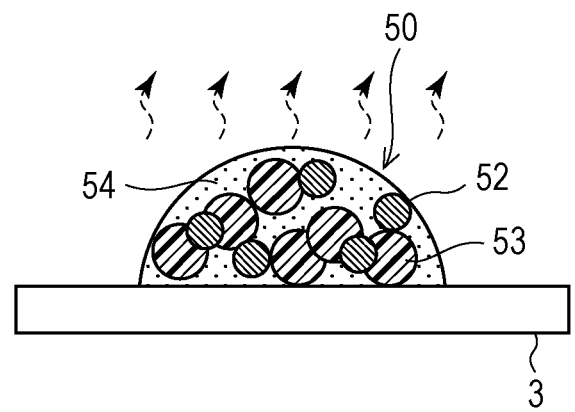
FIGS. 1A to 1C are representations illustrating a process how an ink droplet having a relatively high dynamic surface tension is fixed.
Figure 1B:
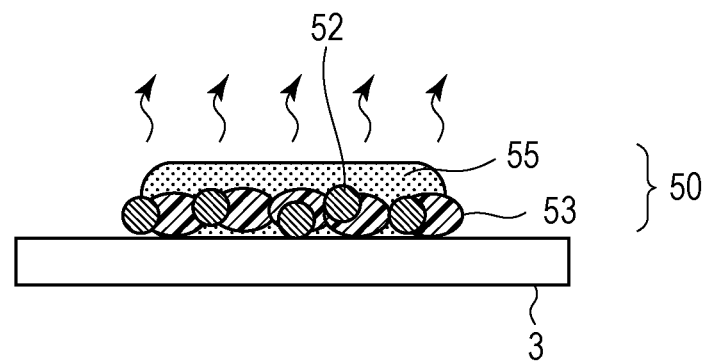
Figure 1C:
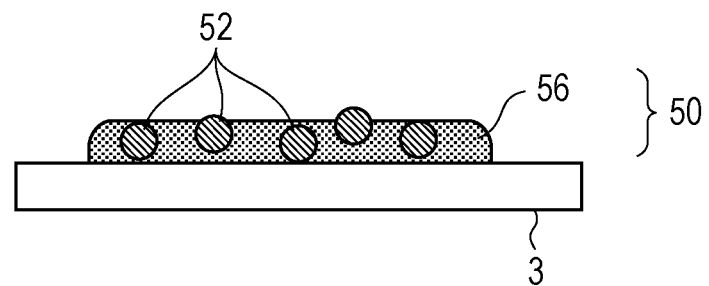
Figure 2A:
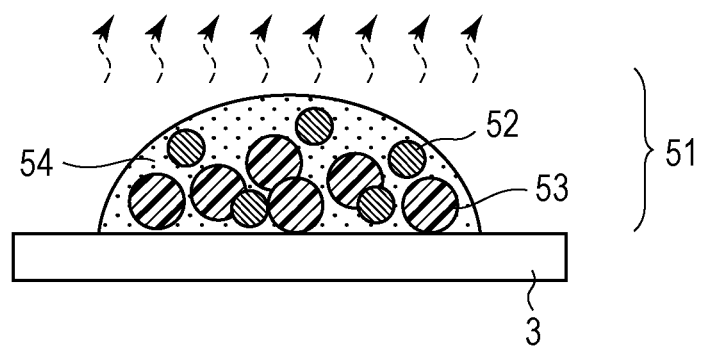
FIGS. 2A to 2C are representations illustrating a process how an ink droplet having a relatively low dynamic surface tension is fixed.
Figure 2B:
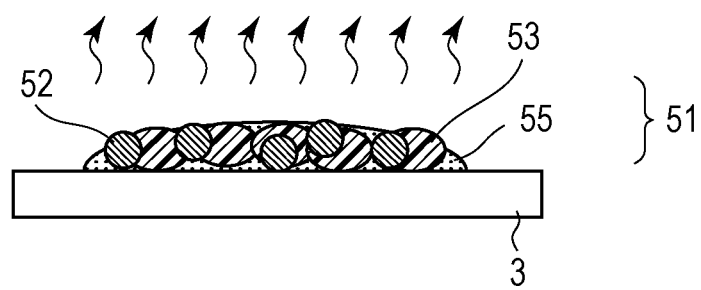
Figure 2C:
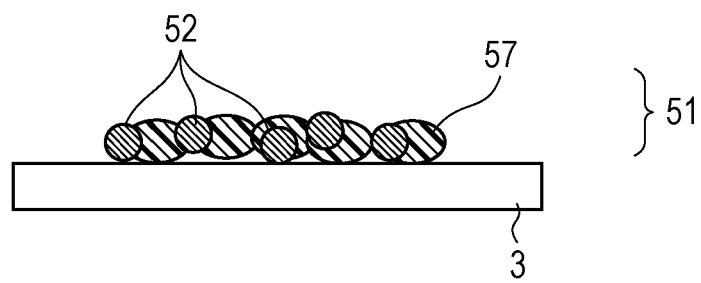
Figure 3:
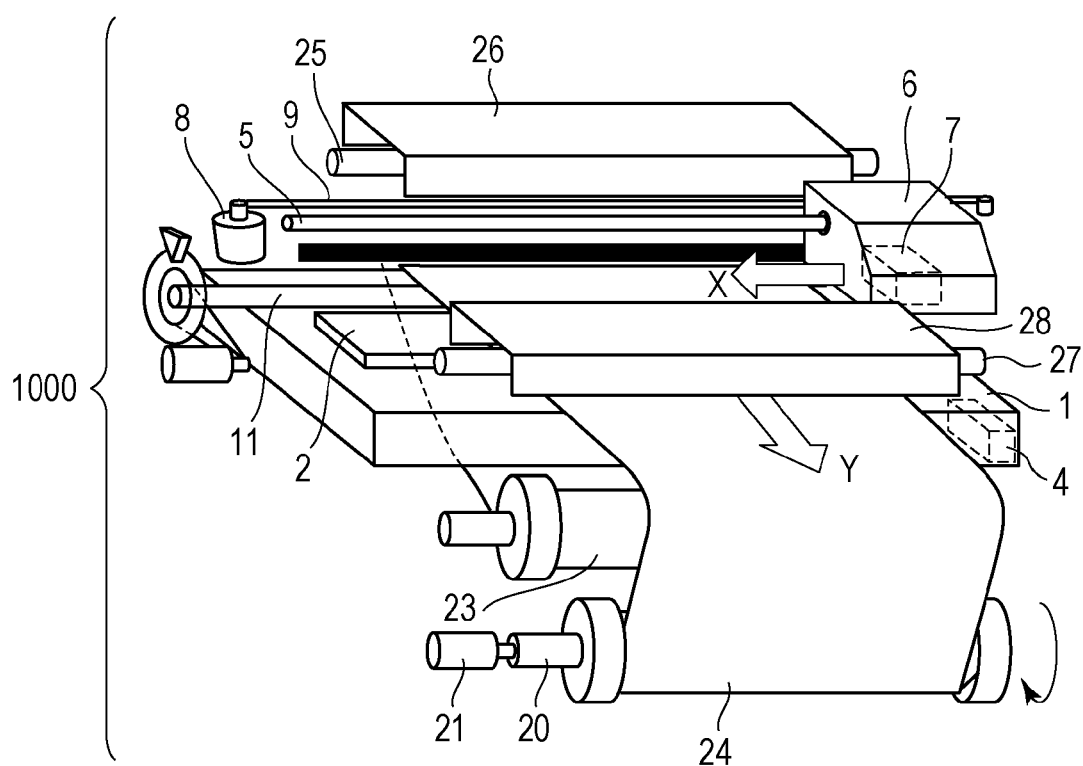
FIG. 3 is a perspective view of an image printing apparatus according to an embodiment.

FIG. 3 is a perspective view in partial interior of an image printing apparatus 1000 according to the present embodiment.

Figure 4:
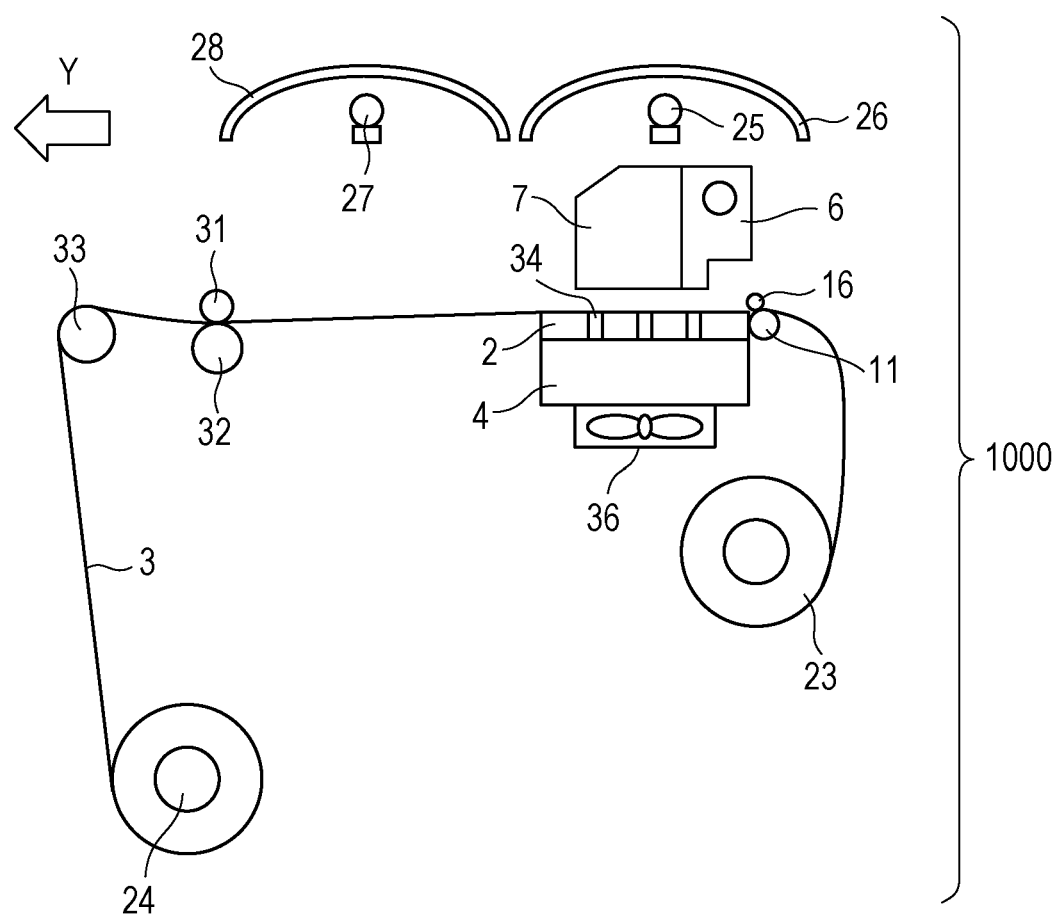
FIG. 4 is a side view of the image printing apparatus according to the embodiment.

FIG. 4 is a schematic side view in partial interior of the image printing apparatus 1000 of the present embodiment.

The image printing apparatus 1000 contains a housing 1 and a platen 2 above the housing 1. The platen 2 has a plurality of suction holes 34 that suck a printing medium 3 to keep the medium from floating. The suction holes 34 communicate with a duct 4. The printing medium 3 is sucked to the platen 2 by the operation of a suction fan 36 disposed under the duct 4.

A carriage 6 is held for reciprocal movement in directions parallel to the X direction (scanning direction) by a main rail 5 extending along the longitudinal direction of the housing 1. The carriage 6 contains an ink jet printing head 7. The ink jet printing technique applied to the printing head 7 may be selected various techniques, such as a thermal jet technique using a heating element and a piezoelectric technique using piezoelectric elements. A carriage motor 8 is a driving source for moving the carriage 6 in the X direction, and the rotational driving force of the carriage motor 8 is transmitted to the carriage 6 with a belt 9.

The printing medium 3 is a part of a rolled medium 23 fed therefrom. The printing medium 3 is conveyed on the platen 2 in the Y direction (conveying direction) intersecting the X direction. The printing medium 3 is pinched at an end thereof between a pitch roller 16 and a conveying roller 11. The rotation of the conveying roller 11 enables the printing medium 3 to be conveyed. The printing medium 3 is also pinched at a position downstream of the Y direction from the platen 2 between a roller 31 and a sheet ejection roller 32 and is further wound on a take-up roller 24 via a turning roller 33.

In the present embodiment, the coloring material in an ink in liquid will be fixed to the printing medium 3 by heat from a first heater 25 opposing the platen 2 and a second heater 27 opposing the platen 2 at a position downstream of the Y direction from the platen 2.

The first heater 25 and the second heater 27 are covered with a first heater cover 26 and a second heater cover 28, respectively. The first heater cover 26 and the second heater cover 28 each function to help the corresponding heater efficiently heat the surface of the printing medium 3 and to protect the corresponding heater. The first heater 25 is intended to evaporate the water in the ink to increase the viscosity of the ink droplet. Thus the printing medium 3 has been uniformly heated when an ink is ejected from the printing head 7. In the present embodiment, the first heater 25 is set to such a temperature that the surface of the printing medium can be heated to 60° C. When the ink receives heat from the first heater 25, the ink need not be completely fixed to the printing medium 3, but is in a state where the viscosity is increased to the extent that the flowability thereof is reduced. The first heater 25 may be a fan heater, an infrared heater, a thermal conduction heater used in contact with the printing medium, and other types. Among these an infrared heater is particularly suitable.

The second heater 27 heats the printing medium 3 at a higher temperature than the first heater 25 so that the polymer emulsion (described later) in the ink can coalesce into a film and fix the ink droplet to the surface of the printing medium 3. In the present embodiment, the second heater 27 is set to such a temperature that the surface of the printing medium can be heated to 90° C.

Although the present embodiment is adapted to heat the printing medium 3 with the first heater 25 and the second heater 27 in two steps, the heating of the printing medium 3 is not limited to this. For example, the heating may be performed in three or more steps, or may be performed only once.

Figure 5:
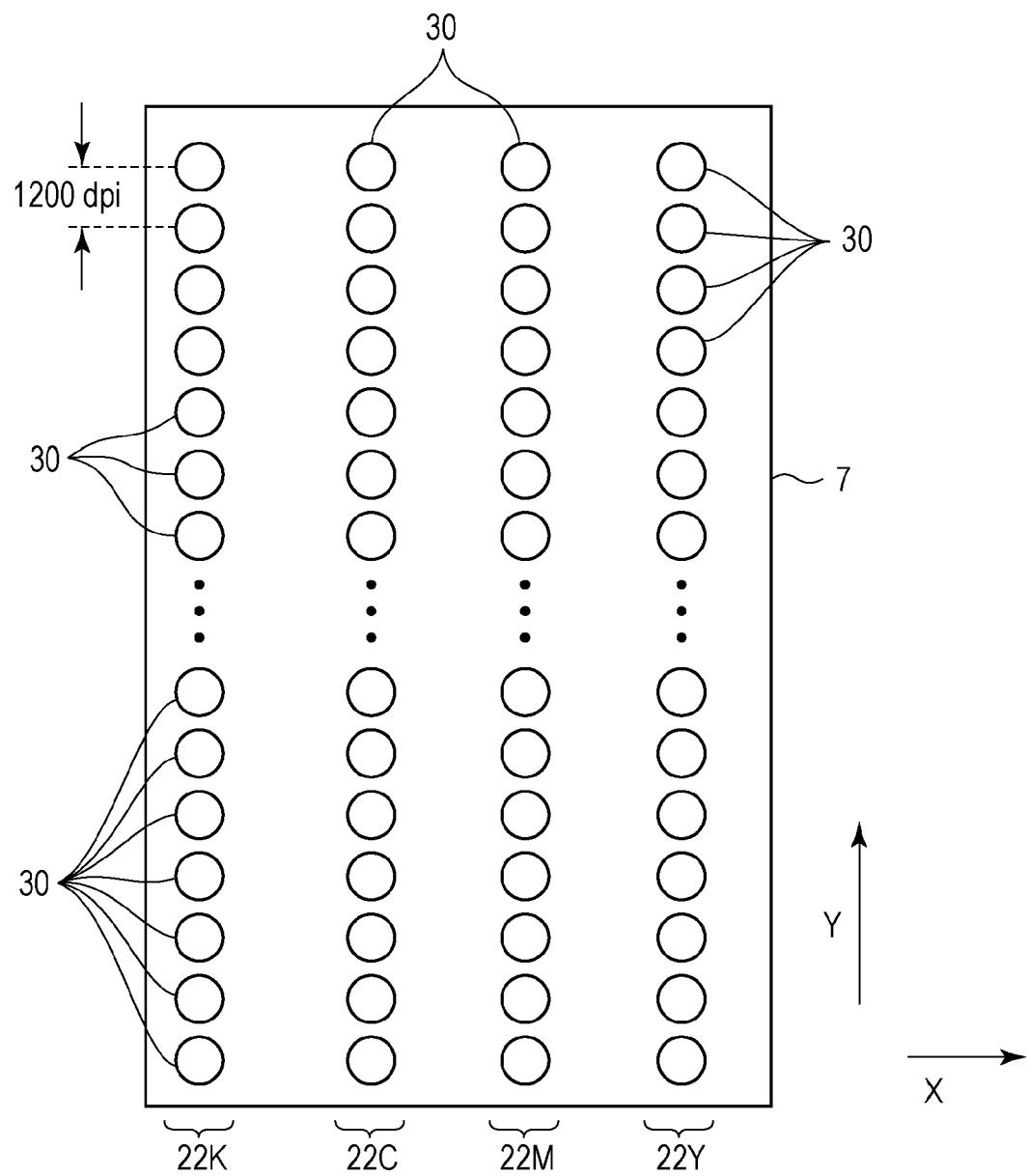
FIG. 5 is a representation of a printing head according to an embodiment.

FIG. 5 shows the printing head 7 of the image printing apparatus 1000 of the present embodiment.

The printing head 7 has four ejection opening lines 22K, 22C, 22M and 22Y arranged in parallel in the X direction. Inks of black (K), cyan C), magenta (M) and yellow (Y) are ejected through ejection openings 30 in the lines 22K, 22C, 22M and 22Y, respectively. Each of the ejection opening lines 22K, 22C, 22M and 22Y has 1440 ejection openings 30 aligned in the Y direction with a density of 1200 dpi. In the present embodiment, the amount of ink ejected at one time through one ejection opening 30 is about 4.5 ng.

Each of the ejection opening lines 22K, 22C, 22M and 22Y communicates with a corresponding ink tank (not shown) that stores the corresponding ink so that the ink is fed from the ink tank. The printing head 7 and the ink tank may be integrated into one body or may be separable.

The inks used in the present embodiment will now be described in detail.
In the following description, "part(s)" and "%" are on a mass basis unless otherwise specified.

Each ink used in any embodiment of the present invention contains a polymer emulsion. The term "polymer emulsion" mentioned herein refers to polymer particles dispersed in water. Examples of the polymer emulsion include acrylic emulsions synthesized by emulsion polymerization of a monomer such as alkyl(meth)acrylate ester or (meth)acrylic acid alkylamide, styrene-acrylic emulsion synthesized by emulsion polymerization of alkyl(meth)acrylate ester or (meth)acrylic acid alkylamide with styrene monomer, polyethylene emulsion, polypropylene emulsion, polyurethane emulsion, and styrene-butadiene emulsion. Other types of polymer emulsion may also be used such as a core-shell polymer emulsion including cores and shells that are made of polymers having different compositions, or an emulsion produced by emulsion polymerization using seeds of acrylic resin particles synthesized in advance for controlling the particle size. Also, a hybrid polymer emulsion may be used which is produced by chemically combining different types of polymer emulsions, such as a combination of an acrylic polymer emulsion and a urethane polymer emulsion.

In the following embodiment, polymer liquid P, prepared by diluting a styrene-acrylic emulsion JONCRYL 790 (produced by BASF, average particle size D: 200 nm, glass transition temperature Tg: 90° C.) with water to a solid polymer content of 20% by weight, is used as the polymer emulsion.

The polystyrene-equivalent number average molecular weight (Mw), measured by gel permeation chromatography (GPC), of the polymer emulsion is preferably in the range of 100,000 to 3,000,000, more preferably in the range of 300,000 to 2,000,000.

Also, the average particle size of the polymer emulsion is preferably in the range of 50 nm to 250 nm. If the average particle size is less than 50 nm, the surface area per unit volume of the particles in the polymer emulsion increases and the aggregation force among particles increases accordingly. Consequently, the emulsion is unlikely to be stably stored. If the average particle size is larger than 250 nm, the settling velocity of the polymer emulsion is high in the ink. Consequently, the emulsion is unlikely to be stably ejected or stably stored.

The polymer emulsion preferably has a glass transition temperature (Tg) in the range of 40° C. to 90° C. A polymer emulsion having a Tg of 40° C. or more can be cured to a satisfactory hardness and is therefore effective in increasing rub fastness. A polymer emulsion having a TG of 90° C. or less can have a low minimum film forming temperature. In this instance, the polymer applied to the printing medium is easy to soften and accordingly helps fix the printed image efficiently. Accordingly, it is advantageous to use a polymer emulsion having a Tg in the range of 40° C. to 90° C., such as methyl(meth)acrylate, n-butyl(meth)acrylate, or 2-ethylhexyl(meth)acrylate.

The polymer emulsion content in the ink is preferably in the range of 0.1% to 10.0% by mass relative to the total mass of the ink. More preferably, it is in the range of 2.0% to 8.0% by mass. If the polymer emulsion content is less than 0.1% by mass, the rub fastness of the printed image can be insufficient. If the polymer emulsion content is more than 10.0% by mass, the viscosity of the ink can increase to the extent that the ink cannot be stably ejected.

Preparation of Black Ink
(1) Preparation of Black Dispersion Liquid

First, an AB block copolymer having an acid value of 250 and a number average molecular weight of 3000 is produced from benzyl acrylate and methacrylic acid in a conventional process. The block copolymer is neutralized with an aqueous solution of potassium hydroxide and then diluted with ion exchanged water to yield a 50% by mass homogeneous aqueous solution of the polymer.

The resulting polymer solution is mixed with a carbon black Printex 85 (produced by Degussa) as a pigment, and ion exchanged water, followed by mechanical stirring for 0.5 hour. The proportions of the pigment, the polymer solution and the ion exchanged water are appropriately adjusted so that the final concentrations of the pigment and the polymer will be 10% and 6% respectively in terms of solid.

Subsequently, the resulting mixture is passed through the interaction chamber of a microfluidizer five times at a liquid pressure of about 70 MPa, thereby yielding a dispersion liquid. Then, the dispersion liquid is centrifuged (at 12,000 rpm for 20 minutes) to remove undispersed components including course particles, thus yielding black dispersion liquid K.
(2) Preparation of Black Ink For preparing a black ink, black dispersion liquid K is mixed with the following ingredients. After being sufficiently stirred, the mixture is subjected to pressure filtration through a microfilter of 2.5 μm in pore size (produced by Fujifilm Corporation) to yield a pigment ink containing 2% by mass of the pigment and 2% by mass of a dispersant.
Black dispersion liquid K prepared above: 2 parts
Polymer solution P: 3 parts
Water-soluble organic solvent (film forming agent) 2-pyrrolidone: 7 parts
Water-soluble organic solvent 2-methyl-1,3-propanediol: 13 parts
Fluorocarbon surfactant CAPSTONE FS-3100 (produced by Du Pont): 0.5 part
Ion exchanged water: balance
Preparation of Cyan Ink
(1) Preparation of Cyan Dispersion Liquid A self-dispersible pigment dispersion liquid Cab-O-Jet 250C (produced by Cabot) is diluted with water and sufficiently stirred to yield cyan dispersion liquid C (pigment content: 10.0% by mass)
(2) Preparation of Cyan Ink For preparing a cyan ink, cyan dispersion liquid C is mixed with the following ingredients. After being sufficiently stirred, the mixture is subjected to pressure filtration through a microfilter of 2.5 μm in pore size to yield a pigment ink containing 2% by mass of the pigment and 2% by mass of a dispersant.
Cyan dispersion liquid C prepared above: 2 parts
Polymer solution P: 3 parts
Water-soluble organic solvent (film forming agent) 2-pyrrolidone: 7 parts
Water-soluble organic solvent 2-methyl-1,3-propanediol: 13 parts
Fluorocarbon surfactant Zonyl FSO-100 (produced by Du Pont): 0.5 part
Ion exchanged water: balance
Preparation of Magenta Ink (1) Preparation of Magenta Dispersion Liquid A self-dispersible pigment dispersion liquid Cab-O-Jet 265M (produced by Cabot) is diluted with water and sufficiently stirred to yield magenta dispersion liquid M (pigment content: 10.0% by mass).
(2) Preparation of Magenta Ink For preparing a magenta ink, magenta dispersion liquid M is mixed with the following ingredients. After being sufficiently stirred, the mixture is subjected to pressure filtration through a microfilter of 2.5 μm in pore size to yield a pigment ink containing 2% by mass of the pigment and 2% by mass of a dispersant.
Magenta dispersion liquid M prepared above: 2 parts
Polymer solution P: 3 parts
Water-soluble organic solvent (film forming agent) 2-pyrrolidone: 7 parts
Water-soluble organic solvent 2-methyl-1,3-propanediol: 13 parts
Fluorocarbon surfactant Zonyl FSO-100 (produced by Du Pont): 0.5 part
Ion exchanged water: balance
Preparation of Yellow Ink
(1) Preparation of Yellow Dispersion Liquid A self-dispersible pigment dispersion liquid Cab-O-Jet 740Y (produced by Cabot) is diluted with water and sufficiently stirred to yield yellow dispersion liquid Y (pigment content: 10.0% by mass).
(2) Preparation of Yellow Ink For preparing a yellow ink, yellow dispersion liquid Y is mixed with the following ingredients. After being sufficiently stirred, the mixture is subjected to pressure filtration through a microfilter of 2.5 μm in pore size to yield a pigment ink containing 2% by mass of the pigment and 2% by mass of a dispersant.
Yellow dispersion liquid Y prepared above: 2 parts
Polymer solution P: 3 parts
Water-soluble organic solvent (film forming agent) 2-pyrrolidone: 7 parts
Water-soluble organic solvent 2-methyl-1,3-propanediol: 13 parts
Fluorocarbon surfactant Zonyl FSO-100 (produced by Du Pont): 0.5 part
Ion exchanged water: balance As described in the preparations of the inks above, each of the inks used in the present embodiment contains a water-soluble organic solvent 2-pyrrolidone. 2-Pyrrolidone acts as a film forming agent and reduces the minimum film forming temperature of the polymer emulsion. In an ink containing a film forming agent, the polymer emulsion can start coalescing into a film even if the temperature for fixing the ink to the surface of a printing medium is relatively low.

Each of the inks used in the present embodiment contains a fluorocarbon surfactant having a perfluoroalkyl group to control the static surface tension thereof. The surfactant contained in the inks is however not limited to fluorocarbon surfactant. The inks need not contain a surfactant.

The dynamic surface tension of the inks will now be described in detail.

In the present embodiment, the dynamic surface tension is measured by a maximum bubble pressure method. This method will now be described. The maximum bubble pressure method is a technique to measure the surface tension of a liquid. In this method, the surface tension is determined by measuring the maximum pressure required to release bubbles formed at the end of a probe (thin tube) immersed in the liquid. The bubble lifetime in the maximum bubble pressure method is the period of time from the time when a surface of a bubble is formed at the end of the probe after a previously formed bubble separates from the probe to the time when the bubble pressure reaches the maximum (when the curvature radius of the bubble becomes equal to the radium of the end of the probe).

In the present embodiment, the dynamic surface tensions of the inks are measured by the maximum bubble pressure method described above using an automatic dynamic surface tensiometer (manufactured by Kyowa Interface Science).

Almost all the water contained in one droplet (4.5 ng) of any of the inks used in the present embodiment will be evaporated at 25° C. by 1000 ms after the droplet has landed on a non-absorbent printing medium. Therefore the ink droplet finishes spreading within 1000 ms and the shape of the dot thereof on the printing medium is determined. As an ink droplet spreads to wet a larger area, the surface area of the ink droplet increases. Consequently, the film forming agent 2-pyrrolidone evaporates markedly and the rub fastness of the printed image is degraded. Accordingly, in the present embodiment, the dynamic surface tension of each ink is measured at room temperature (25° C.) at a bubble lifetime of 1000 ms to estimate the degradation of the rub fastness of the image printed with the ink. Although dynamic surface tension at 25° C. is measured for estimation of the degradation of rub fastness in the present embodiment, the temperature for measuring dynamic surface tension is not limited to 25° C. Dynamic surface tension is not varied much within a temperature range in which normal printing is performed.

In the present embodiment, the dynamic surface tension of each ink is measured three times at a bubble lifetime of 1000 ms and the average value of the measurements is defined as dynamic surface tension $\gamma_{AVE}$. The dynamic surface tensions $\gamma_{AVE}$ of the inks used in the present embodiment are shown in Table 1.

TABLE 1

| Ink | Dynamic surface tension $\gamma_{AVE}$ |
|---|---|
| Black | 17.0 mN/m |
| Cyan | 17.0 mN/m |
| Magenta | 18.5 mN/m |
| Yellow | 16.0 mN/m |

The printing medium used in the present embodiment will now be described in detail.

In the present embodiment, a glossy white PVC sheet with adhesive (gray glue), KSM-VS (produced by Kimoto), which is a polyvinyl chloride coated sheet, is used as the printing medium. Although the printing medium used in other embodiments is not limited to such a PVC coated sheet, printing media less absorbent or non-absorbent of ink are advantageously used. Printing media less absorbent or non-absorbent of ink other than the PVC sheet include polyester sheets, waterproof-treated pulp sheets, glossy printing sheets provided with a non-absorbent layer on a pulp sheet, and a combined sheets of pulp and chemical fiber.

In the present embodiment, images are formed by multipass printing. A typical multipass printing technique will now be described in detail.

Figure 6:
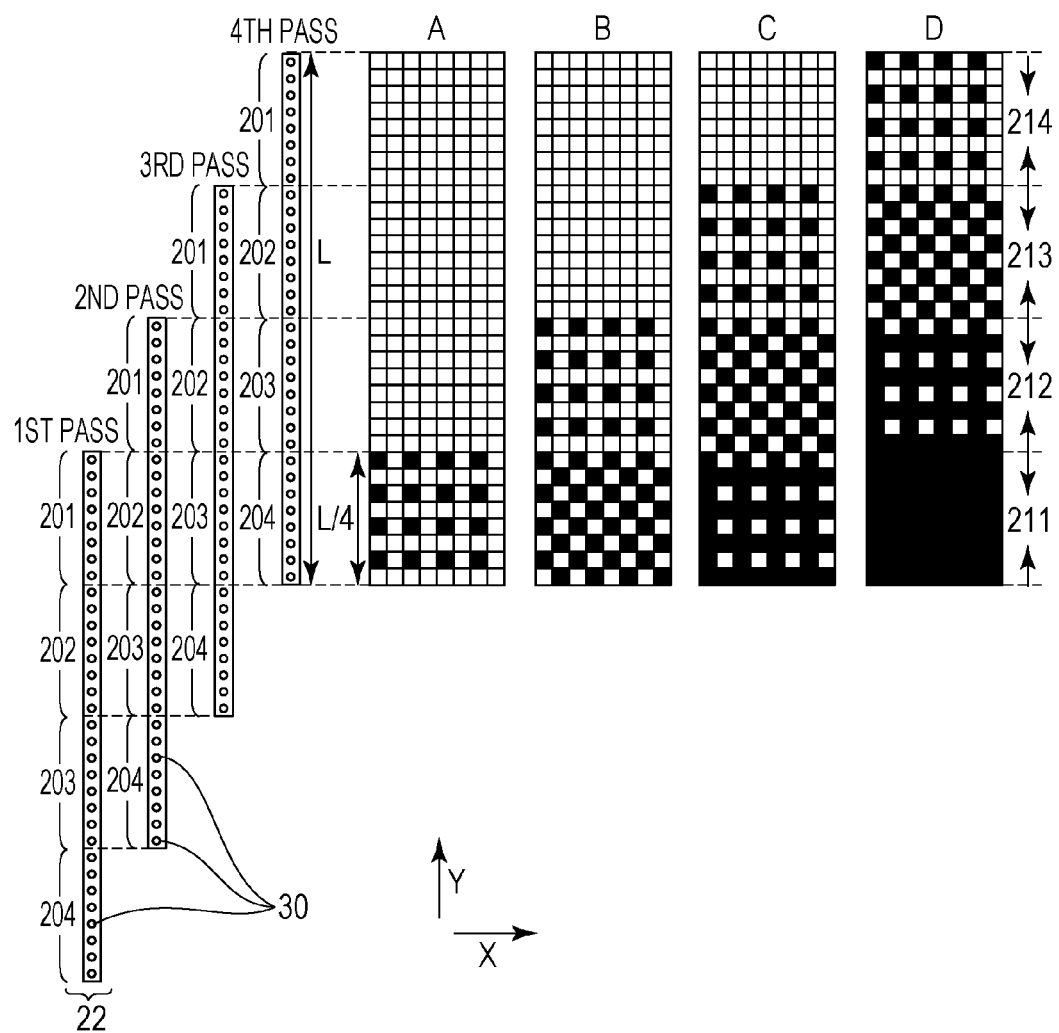
FIG. 6 is a representation of a general multipass printing method.
Figure 7A:
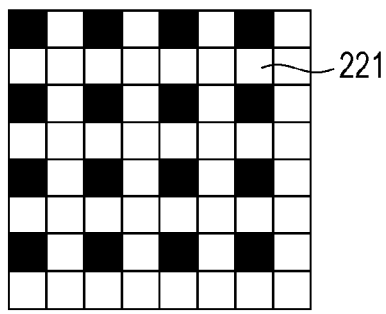
FIGS. 7A to 7D are schematic views of mask patterns used in the general multipass printing method.
Figure 7B:
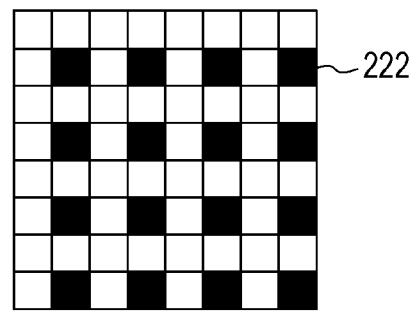
Figure 7C:
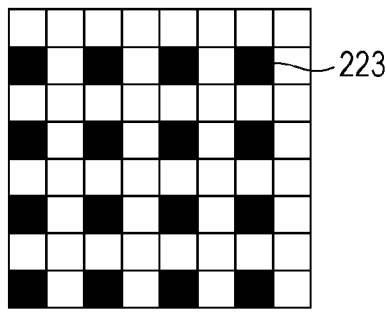
Figure 7D:
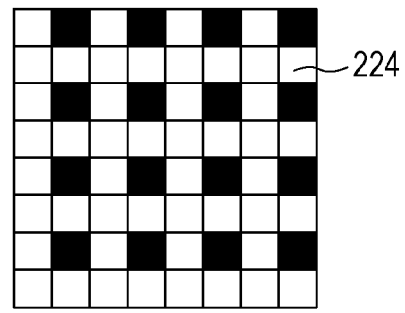

FIG. 6 is a representation of a multipass printing technique for printing an image within a unit region on a printing medium by four print scanning operations.

FIGS. 7A to 7D are representations of mask patters used for each of the four print scanning operations.

Ejection openings 30 of an ejection opening line 22 through which an ink is ejected are divided into four printing groups 201, 202, 203 and 204 in the Y direction.

Each of the mask patterns 221, 222, 223 and 224 includes an arrangement of print permitting pixels defining the positions where ink is to be ejected and print non-permitting pixels defining the positions where the ink is not to be ejected. In FIGS. 7A to 7D, black solid portions indicate the print permitting pixels, and blank portions indicate the print non-permitting pixels. For the print permitting pixels, when input image data represent ejection of an ink, the image data are treated as printing data for ejecting the ink. For the print non-permitting pixels, even if input image data represent ejection of an ink, the image data are treated as printing data for not ejecting ink.

The print permitting pixels of the mask patterns 221, 222, 223 and 224 lie at positions different among the mask patterns so that the logical sum of the print permitting pixels represents all the pixels.

The formation of an image with a duty of 100% (hereinafter referred to as solid image) on a printing medium will be described below by way of example.

In the first print scanning operation (first pass), printing group 201 ejects an ink onto region 211 on the printing medium 3 according to mask pattern 221. The ink is thus applied onto the solid positions indicated in A shown in FIG. 6.

Subsequently, the printing medium 3 is conveyed by a length L/4 in the Y direction relative to the printing head 7.

Then, the second print scanning operation (second pass) is performed. In the second print scanning operation, printing group 202 ejects the ink onto region 211 on the printing medium 3 according to mask pattern 222, and printing group 201 ejects the ink onto region 212 according to mask pattern 221. As the result of the second print scanning operation, an image defined by the solid portions shown in B of FIG. 6 is formed on the printing medium 3.

The print scanning operation of the printing head 7 and the conveyance of the printing medium 3 by their relative movement are alternately repeated. When the fourth print scanning operation (fourth pass) has been made, application of the ink is completed for all of the pixel areas (corresponding to pixels) of region 211 on the printing medium 3, as shown in D of FIG. 6, thus forming a solid image.

In the following description, the pixel areas of the printing medium, corresponding to pixels, may refer to simply "the pixels".

A print control system used in the present embodiment will now be described in detail.

Figure 8:
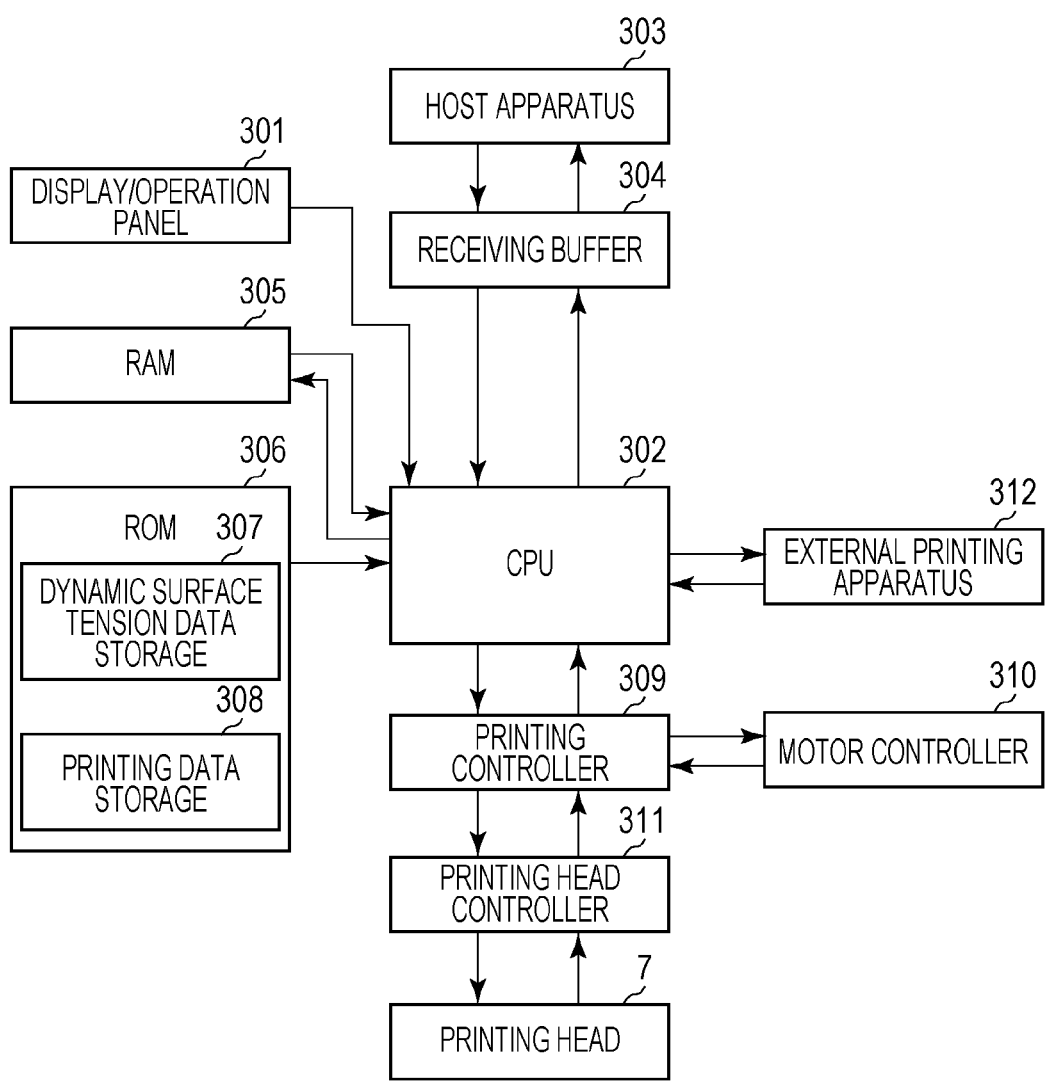
FIG. 8 is a block diagram of the structure of a print control system according to an embodiment.

FIG. 8 is a schematic block diagram illustrating the structure of a print control system of the image printing apparatus 1000 used in the present embodiment.

The image printing apparatus 1000 includes a display/operation panel 301 with which the user operates the apparatus. The display/operation panel 301 includes switches or the like with which the size of the printing medium 3, whether in on-line or in off-line, commands and other information are designated.

The image printing apparatus 1000 also includes a CPU 302 for controlling arithmetic calculation, selection, judgment, operation, and the like. The image printing apparatus 1000 also includes a receiving buffer 304 that temporarily stores multivalued image data transmitted from a host apparatus 303 such as a PC, and a RAM 305 that temporarily stores data being calculated in the CPU 302. Furthermore, the image printing apparatus 1000 includes a ROM 306. The ROM 306 contains a control program to be executed by the CPU 302, and includes a dynamic surface tension data storage 307 and a printing data storage 308. The dynamic surface tension data storage 307 stores dynamic surface tension data of each of the inks used in the present embodiment.

FIG. 9 schematically shows the data stored in the dynamic surface tension data storage 307. As shown in FIG. 9, the dynamic surface tension data storage 307 stores a plurality of dynamic surface tension values measured at different bubble lifetimes for each ink.

The printing data storage 308 includes a memory device that stores dot patterns used for converting multivalued data into binary data, and mask patterns used for dividing binary data for the entirety of an image into a plurality of binary data corresponding to images to be printed by each of a plurality of scanning operations.

The image printing apparatus 1000 further includes a printing controller 309 configured to control printing, a motor controller 310 configured to control the conveyance of the printing medium 3, and a printing head controller 311 configured to control the printing head 7. In addition, an external printing apparatus 312 may be optionally provided.

In the present embodiment, the rub fastness of the printed image is reduced by performing printing such that the connectivity of dots of an ink having a relatively low dynamic surface tension formed on a printing medium by one scanning operation is higher than that of an ink having a relatively high dynamic surface tension.

A possible mechanism will be described below in which the rub fastness is increased by performing printing such that the dot connectivity of an ink having a relatively low dynamic surface tension is higher than that of an ink having a relatively high dynamic surface tension.

FIGS. 10A to 10D show a process of how an ink having a relatively low dynamic surface tension applied with a high dot connectivity by one scanning operation is fixed. The figures each show a state where three droplets of an ink have been applied to the surface of a printing medium close to each other so as to join to each other.

Figure 10A:
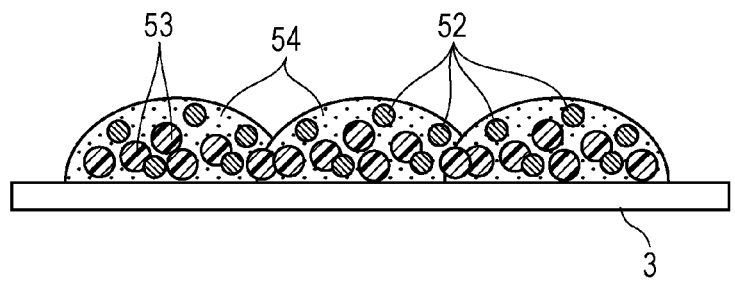
FIGS. 10A to 10D are representations how an ink applied with a high dot connectivity is fixed.

Immediately after being ejected to the printing medium, the ink droplets join to each other, keeping their respective hemispherical shapes, as shown in FIG. 10A. When a certain time has passed since this state, the solvent in each droplet comes together at the contact areas of the droplets, and thus the droplets form into a larger droplet, as shown in FIG. 10B.

Figure 10B:
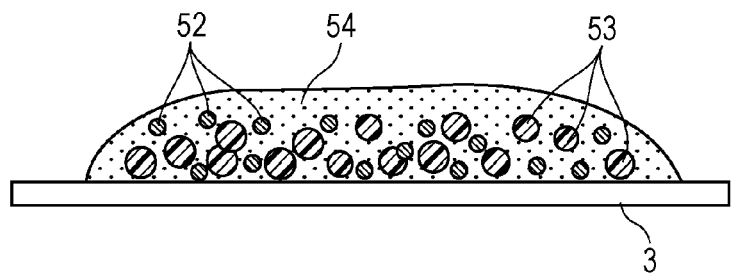
Figure 10C:
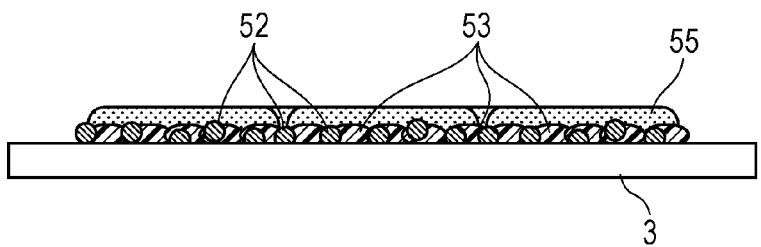
Figure 10D:
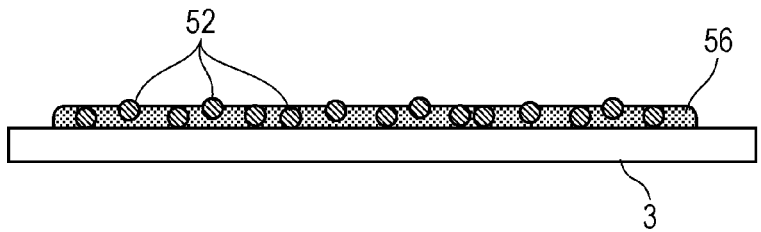

The comparison between the states shown in FIGS. 10A and 10B shows that the surface area, at the interface between the ink and the air, of the larger dot shown in FIG. 10B is smaller. Accordingly, the film forming agent 2-pyrrolidone in the ink is more hindered from evaporating in comparison with the case where three droplets are applied so as not to join to each other. Therefore the film forming agent remains sufficiently in the ink even though another time has passed since the state shown in FIG. 10B and almost all the water in the solvent has evaporated as shown in FIG. 10C. It is thus assumed that the remaining film forming agent can reduce the minimum film forming temperature of the polymer emulsion and facilitate the melting and film forming of the polymer emulsion, as shown in FIG. 10D.

It will be described in detail below how the dot connectivity is estimated in the present embodiment. The dot connectivity mentioned herein is estimated by the number of dots formed at adjoining positions on a printing medium by the same one scanning operation.

Figure 11A:
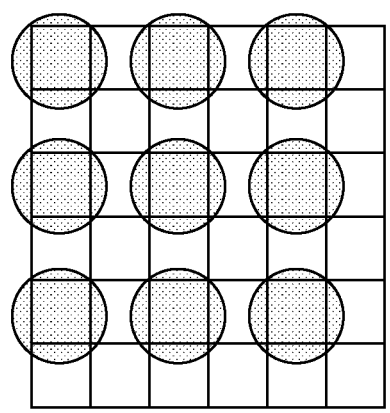
FIGS. 11A and 11B are representations of the definition of dot connectivity in an embodiment.
Figure 11B:
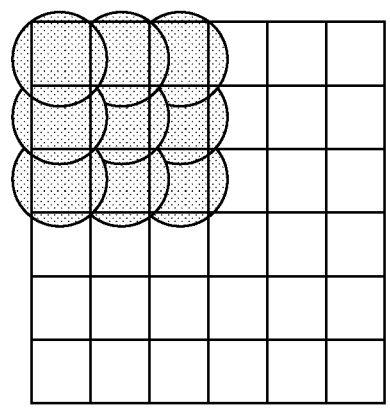

FIGS. 11A and 11B are representations of the dot connectivity mentioned herein.

The dot connectivity can be estimated by counting the number of dots joining into a larger dot of the dots formed by ejecting an ink in a region, and averaging the number of joining dots in the region.

For example, nine dots shown in FIG. 11A are each formed separately from each other by one scanning operation. Thus, there are no joining dots in the region of 6 pixels×6 pixels. In this instance, the number of joining dots is 1 for all the dots in the region. The average number of joining dots in the region is 1.

On the other hand, nine dots shown in FIG. 11B have been formed at positions adjoining each other by one scanning operation, and have joined into a larger dot. The number of joining dots in the larger dot is 9. Also, there are no dots except the larger dot in the region of 6 pixels×6 pixels. Hence, the dot connectivity, or the average of the number of joining dots, in the region is estimated as 9.

A method will be described for examining whether or not the rub fastness of an image is increased by controlling the dot connectivity.

For this evaluation, a Gakushin-type rubbing tester (in accordance with JIS L 0849) is used for estimating rub fastness.

A printing medium 3 on which a solid pattern has been printed is placed in an arc-shaped test table of the tester, and is then brought into contact with a 500 g rubber. The rubber used herein is provided with a white rubbing cloth (#3 cotton cloth specified in JIS L 0805). Under these conditions, the test table is horizontally and reciprocally moved 150 times while a load is placed on the table for estimating how much the solid image is rubbed. The criteria for evaluation of the fixability of the printed image are as follows:

Evaluation: good

There is substantially no change in the region of the printed image before and after the test. In the region of the printing medium where no image is printed (hereinafter referred to as black region), a trace of a coloring material dragged is hardly observed.

Evaluation: fair

A mark from removal is observed in the region of the printed image after the test. In the blank region, there is observed a line of a coloring material dragged from the boundary between the image-printed region and the blank region, but the boundary is distinct.

In addition, it is estimated how much the polymer emulsion is fused (hereinafter referred to as polymer emulsion fused degree) by controlling the dot connectivity.

In the present embodiment, the surfaces of the solid patterns are observed through Hitachi Ultra-High-Resolution Analytical Scanning Electron Microscope SU-70 (manufactured by Hitachi High-Technologies) to check whether or not the particles in the polymer emulsion keep their shapes.

Table 2 shows the evaluation results of the rub fastness of and the polymer emulsion fused degree in the images printed with the inks prepared above while dot connectivity is controlled. For these evaluations, when none of the dots formed in a region by one scanning operation join each other as shown in FIG. 11A (when dot connectivity is 1), the dot connectivity is considered to be low, and when 9 dots of the dots formed in the region by one scanning operation join each other (when dot connectivity is 9), the dot connectivity is considered to be high. A non-absorbent glossy white PVC sheet with adhesive (gray glue), KSM-VS (produced by Kimoto), is used as the printing medium. For preparing test samples, each image is printed at 60° C., followed by heating at 90° C. The resulting test samples are examined for the rub fastness and graininess thereof and the polymer emulsion fused degree therein.

For graininess, when a solid pattern visually observed is substantially not grainy and relatively uniform, the graininess of the solid pattern is judged excellent; when it is slightly grainy and less uniform than the case of excellent graininess, the graininess of the solid pattern is judged good.

TABLE 2

| Ink | Dynamic surface tension $\gamma_{AVE}$ | Dot connectivity | Graininess | Polymer emulsion fused degree | Rub fastness |
|---|---|---|---|---|---|
| Black | 17.0 mN/m | low | Excellent | Incomplete | Fair |
|  |  | high | Good | Almost complete | Good |
| Cyan | 17.0 mN/m | low | Excellent | Incomplete | Fair |
|  |  | high | Good | Almost complete | Good |
| Magenta | 18.5 mN/m | low | Excellent | Almost complete | Good |
|  |  | high | Good | Almost complete | Good |
| Yellow | 16.0 mN/m | low | Excellent | Incomplete | Fair |
|  |  | high | Good | Almost complete | Good |

In the magenta ink, which has a relatively large dynamic surface tension as shown in Table 2, the film forming agent is difficult to evaporate during fixing the ink even if the dot connectivity is low, and the minimum film forming temperature of the polymer emulsion is reduced. Consequently, the film formation of the polymer emulsion proceeds to increase the rub fastness of the printed image.

On the other hand, the black, cyan and yellow inks, which have relatively low dynamic surface tensions, form images having low rub fastness when their dot continuities are low.

However, when dot continuities of the black, the cyan and the yellow ink are each increased, the rub fastnesses of the printed images are increased because a sufficient amount of film forming agent remains in the ink. These results suggest that it is effective to increase the dot connectivity of inks having larger dynamic surface tension.

If printing is performed with a high dot connectivity, the image is formed by a plurality of adjoining ink droplets joining into a larger dot. Accordingly, the graininess of the image tends to increase relative to the case of an image formed with a low dot connectivity. However, the increased graininess resulting from the increased dot connectivity is not so bad as to result in degraded image quality. Thus the printed image exhibits good quality and high rub fastness.

In view of the above evaluation results, in the present embodiment, the magenta ink, which has a relatively high dynamic surface tension, is ejected so that the dot connectivity becomes low, and the black, the cyan and the yellow ink are ejected so that their dot connectivities become high. By controlling the ejection of the inks as above, the magenta ink can form an image with reduced graininess and high rub fastness. For the black, the cyan and the yellow ink, their graininesses tend to increase to some extent, but are not so bad as to affect negatively image quality, and their images can have high rub fastness.

FIG. 12 is a representation of a multipass printing method applied to the present embodiment. In the following description, two ejection opening lines 22K and 22M, for the black ink and the magenta ink respectively, of the four ejection opening lines 22K, 22C, 22M and 22Y will be described for the sake of simplicity.

In the present embodiment, an image formation in a unit region 80 on a printing medium is completed by 6 print scanning operations. The printing head 7 used in the present embodiment includes ejection opening line 22K having ejection openings through which a black ink is ejected, and ejection opening line 22M having ejection openings through which a magenta ink is ejected. In each ejection opening line, 1440 ejection openings are aligned and grouped into 6 printing groups: A1 to A8 or B1 to B8, each having a length d. Hence, each printing group has 240 ejection openings.

The length in the Y direction of one unit region 80 on the printing medium 3 is equal to the amount of relative movement in the Y direction in one print scanning operation of the printing head 7 and the printing medium 3, and is also equal to the length d of each printing group of the ejection opening lines 22K and 22M. The length of the unit region 80 in the X direction is equal to the length of the printing medium 3 in the X direction.

When a unit region 80, first, lies a position 80a (State (a)), inks are ejected onto the unit region 80 from the ejection openings of printing group A1 in ejection opening line 22K and the ejection openings of printing group B1 in ejection opening line 22M according to mask patterns described later while the printing head 7 is scanning in the X direction. Then, the printing medium 3 is conveyed by length d in the Y direction, so that the unit region 80 is moved to position 80b (State (b)). After the conveyance, the inks are ejected from the ejection openings of printing group A2 in ejection opening line 22K and ejection openings of printing group B2 in ejection opening line 22M onto the unit region 80 that has received inks ejected from the ejection openings of printing groups A1 and B1 while the printing head 7 is scanning in the X direction. The printing head 7 thus scans the unit region 80 on the printing medium 3 six times in total to complete image formation while the printing medium 3 is conveyed by distance d between scanning operations.

In the present embodiment, the dot connectivity is controlled by varying the average number of print permitting pixels in print permitting pixel units between the mask patterns used for the black ink and the mask patterns used for the magenta ink. Each print permitting pixel unit may be a print permitting pixel group defined by a plurality of adjoining print permitting pixels, or a separate print permitting pixel not adjoining other print permitting pixels. It will be described below how the dot connectivity is controlled.

FIGS. 13A to 13D are representations illustrating the definition of the print permitting pixel unit and the number of print permitting pixels in the unit.

Figure 13A:
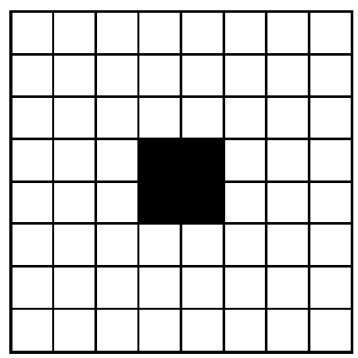
FIGS. 13A to 13D are representations of print permitting pixel units.

As described above, a print permitting pixel group is composed of a plurality of adjoining print permitting pixels. In FIG. 13A, for example, four pixels of 2 pixels×2 pixels define a square print permitting pixel group. In this instance, the number of print permitting pixels is 4 in a print permitting pixel unit.

Figure 13B:
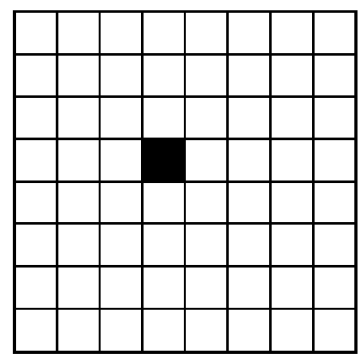

In the present embodiment, even an isolated print permitting pixel not adjoining other print permitting pixels can define a print permitting pixel unit. FIG. 13B shows a print permitting pixel not adjoining any other print permitting pixel. In this instance, the number of print permitting pixels is 1 in a print permitting pixel unit.

Figure 13C:
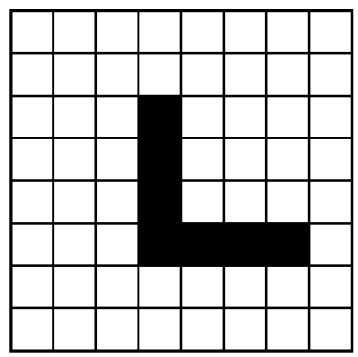

A plurality of print permitting pixels adjoining in a specific direction also define a print permitting pixel group. Print permitting pixel groups are not limited to those in an isotropic shape as shown in FIG. 13A. FIG. 13C shows an L-shaped print permitting pixel group defined by print permitting pixels adjoining in specific directions. In this instance, the number of print permitting pixels is 7 in a print permitting pixel unit.

Figure 13D:
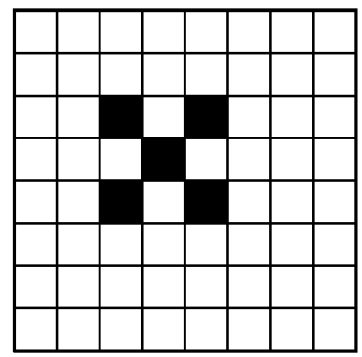

Adjoining print permitting pixels mentioned herein are not limited to those continuing in the X direction or the Y direction, and may continue in an oblique direction. Hence, a print permitting pixel can adjoin 8 print permitting pixels: two print permitting pixels in the X direction; two print permitting pixels in the Y direction; and four print permitting pixels in oblique directions. FIG. 13D shows a print permitting pixel group defined by print permitting pixels adjoining in oblique directions. In this instance, the number of print permitting pixels is 5 in a print permitting pixel unit.

Figure 14A:
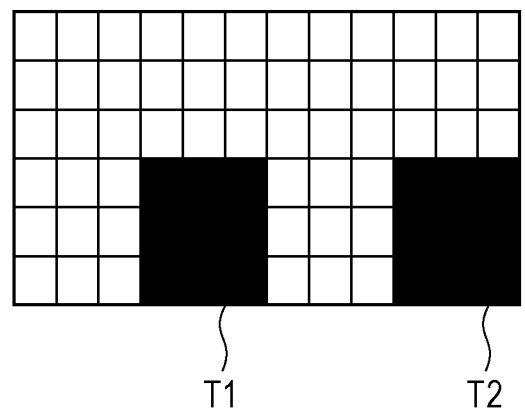
FIGS. 14A and 14B are representations of count regions of mask patterns used in an embodiment.
Figure 14B:
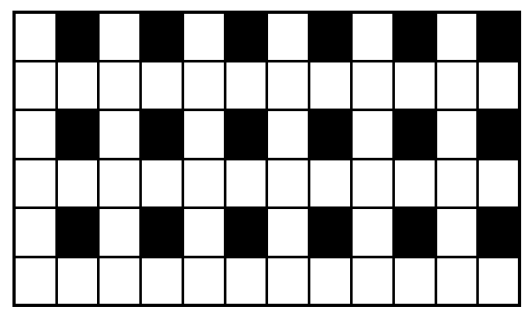

FIGS. 14A and 14B are representations illustrating the determination of the average number per print permitting pixel unit of the print permitting pixels.

For the sake of simplicity, in the following description, the average number per print permitting pixel unit of print permitting pixels is obtained by averaging the numbers of print permitting pixels in print permitting pixel units in a count region defined by a predetermined number of pixels in a unit region 80. FIGS. 14A and 14B each show a mask pattern region, corresponding to a count region in a unit region, defined by 72 pixels consisting of 12 pixels in the X direction by 6 pixels in the Y direction. In the present embodiment, the average number per print permitting pixel unit of print permitting pixels is obtained by counting the number of print permitting pixel units in a mask pattern region corresponding to a count region, and counting the number of print permitting pixels in each print permitting pixel unit in the mask pattern region. Then, the sum of the numbers of print permitting pixels in each print permitting pixel unit is divided by the number of print permitting pixel units. The resulting quotient is the average number per print permitting pixel unit of print permitting pixels in a mask pattern.

For example, the mask pattern region corresponding to a count region shown in FIG. 14A includes print permitting pixel units T1 and T2, each consisting of 9 adjoining print permitting pixels. Hence, the average number per print permitting pixel unit of print permitting pixels in the mask pattern shown in FIG. 14A is 9, which is the quotient of 18 (the sum of the numbers of each print permitting pixel in the print permitting pixel units) by 2.

On the other hand, the mask pattern region corresponding to the count region shown in FIG. 14B includes no adjoining print permitting pixels. In other words, in this mask pattern region, 18 print permitting pixel units, each consisting of one print permitting pixel, are arranged. Hence, the average number per print permitting pixel unit of print permitting pixels in the mask pattern shown in FIG. 14B is 1, which is the quotient of 18 (the sum of the numbers of print permitting pixels in each print permitting pixel unit) by 18.

The mask patterns used in the present embodiment will now be described in detail.

FIG. 15A shows mask patterns used for line 22K of the ejection openings through which the black ink is ejected.

FIG. 15B shows mask patterns used for line 22M of the ejection openings through which the magenta ink is ejected. Although line 22C of the ejection openings for the cyan ink and line 22Y of the ejection openings for the yellow ink are not shown in the figures, the same mask patterns as those for line 22K for the black ink are used.

Printing groups A1 to A6 of black ink ejection opening line 22K use mask patterns 61 to 66, respectively. Each of the mask patterns consisting of 25 pixels shown in FIGS. 15A and 15B is a repeating unit of a mask pattern. In practice, each mask pattern shown in the figures is repeatedly used while printing proceeds in the X direction and the Y direction.

Substantially the same number of print permitting pixels are arranged in mask patterns 61 to 66. The print permitting pixels of the mask patterns 61 to 66 lie at positions different among the mask patterns so that the logical sum of the print permitting pixels represents all the pixels.

The use of these mask patterns allows the black ink to be used in substantially the same amount from the first to the sixth scanning operation. Also, the black ink is applied to all the positions to be applied in the unit region by the first to sixth scanning operations.

The average number per print permitting pixel unit of print permitting pixels in each of the mask patterns 61, 62, 63, 65 and 66 of the mask patterns 61 to 66 is 4, according to the above-described definition. The average number per print permitting pixel unit of print permitting pixels in mask pattern 64 is 5.

Printing groups B1 to B6 of magenta ink ejection opening line 22M use mask patterns 71 to 76, respectively.

Also, as with mask patterns 61 to 66, substantially the same number of print permitting pixels are arranged in each of the mask patterns 76 to 66. The print permitting pixels of the mask patterns 71 to 76 lie at positions different among the mask patterns and complementary to each other so that the logical sum of the print permitting pixels represents all the pixels.

Thus, the magenta ink is applied in substantially the same amount to all the positions to be applied in the unit region by the first to sixth scanning operations.

The average number per print permitting pixel unit of print permitting pixels in each of the mask patterns 71, 72, 73, 75 and 76 of the mask patterns 71 to 76 is 1. The average number per print permitting pixel unit of print permitting pixels in mask pattern 74 is about 1.3.

Thus, each of the combinations between mask patterns 61 to 66 for the black ink and mask patterns 71 to 76 for the magenta ink, the mask patterns for the black ink each have a larger average number per print permitting pixel unit of print permitting pixels than the corresponding mask pattern for the magenta ink. In other words, the print permitting pixels in mask patterns 71 to 76 for the magenta ink are arranged so that the degree of dispersion in print permitting pixel distribution thereof is higher than that of mask patterns 61 to 66 for the black ink. Accordingly, the ejection of inks can be controlled so that the dot connectivity of the black ink ejected to the surface of a printing medium by one print scanning operation becomes always higher than that of the magenta ink ejected to the surface of the printing medium by one print scanning operation.

Figure 16:
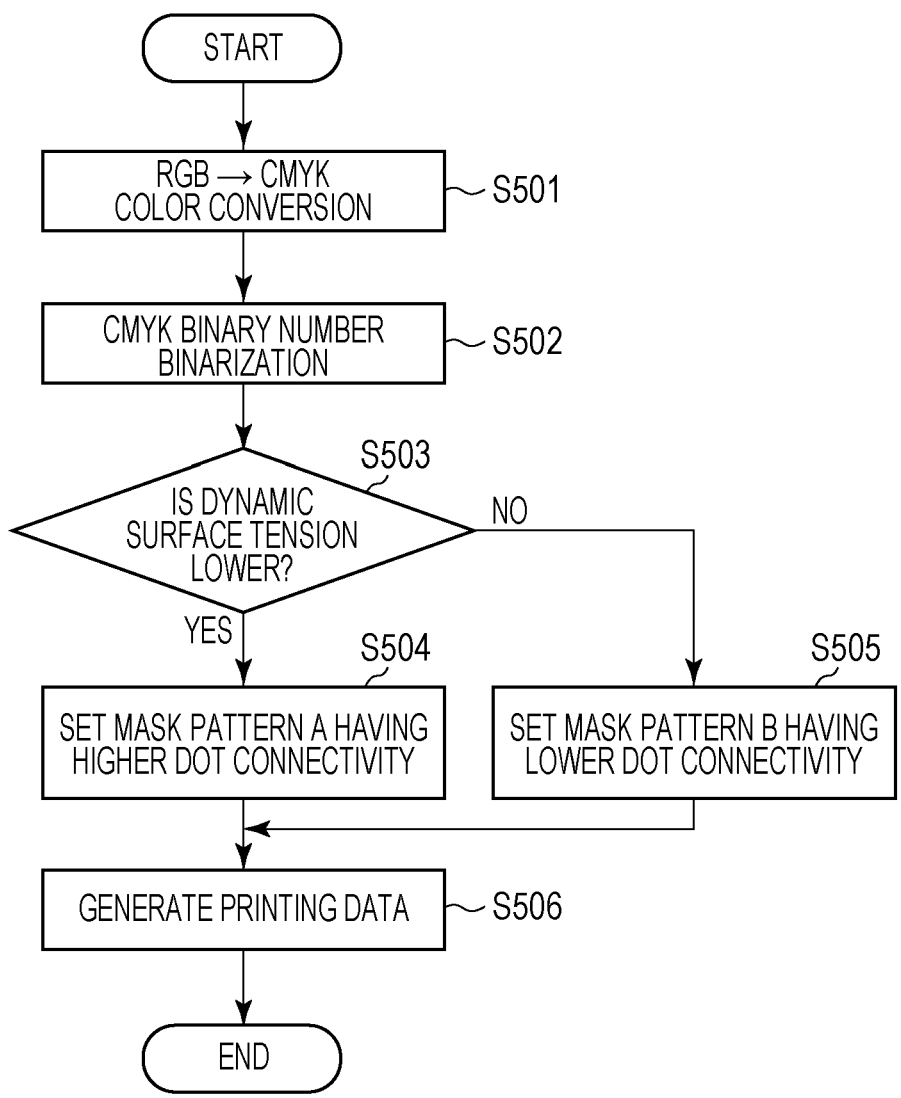
FIG. 16 is a block diagram of a data processing process in an embodiment.

FIG. 16 is a flow chart illustrating a process for processing an image in an image processing section, according to the present embodiment.

In color conversion step S501, RGB multi-valued data input from a host apparatus 303, which is an image input section, are converted into CMYK multi-valued data corresponding to the ink colors to be used for printing.

Subsequently, in binarization step S502, the CMYK multi-valued data converted in color conversion step S501 are each developed to binary image data according to the corresponding pattern stored. This binarization produces binary data for ejecting the black ink, the cyan ink, the magenta ink and the yellow ink.

In selection step S503, binary data corresponding to at least one ink having a relatively low dynamic surface tension are selected from the binary data produced in binarization step S502 according to the table stored in the dynamic surface tension data storage shown in FIG. 9. In the present embodiment, inks having an average dynamic surface tension $\gamma_{AVE}$ of 18.0 mN/m or less at 25° C. and a bubble lifetime of 1000 ms are selected as the ink having a relatively low dynamic surface tension. Hence, in the present embodiment, the binary data for ejecting the black, the cyan and the yellow ink are selected as those for the ink having a relatively low dynamic surface tension. Alternatively, the inks used may be classified in advance into two groups of relatively high dynamic surface tension inks and relatively low dynamic surface tension inks in a table for selecting at least one ink having a relatively low dynamic surface tension.

The binary data for ejecting the black, the cyan and the yellow ink selected in selection step S503 are transmitted to high dot connectivity mask pattern setting step S504, and, in this step, mask patterns having a relatively large average number per print permitting pixel unit of print permitting pixels (having a relatively low dispersion in print permitting pixel distribution) shown in FIG. 15A are assigned. On the other hand, the binary data for ejecting the magenta ink are transmitted to low dot connectivity mask pattern setting step S504, and, in this step, mask patterns having a relatively small average number per print permitting pixel unit of print permitting pixels (having a relatively high dispersion in print permitting pixel distribution) shown in FIG. 15B are assigned.

Then, in printing data generation step S506, the binary data are processed into printing data distributed to a plurality of print scanning operations for each ink, using the corresponding mask patterns assigned in low dot connectivity mask pattern setting step S504 or high dot connectivity mask pattern setting step S505.

The inks are ejected from the printing head 7 of the image printing apparatus 1000 to form an image according to the generated printing data.

Thus, the dot connectivities of the black, the cyan and the yellow ink, which have relatively low dynamic surface tensions and are generally unlikely to allow the polymer emulsion to coalesce into a film sufficiently, can be increased. Consequently, the degradation of the rub fastness of the printed image can be suppressed. On the other hand, the dot connectivity of the magenta ink, which has a relatively high dynamic surface tension and in which the polymer emulsion sufficiently coalesces into a film, can be reduced. Consequently, images having reduced graininess and increased rub fastness can be formed.

Second Embodiment

The first embodiment has described a technique in which inks having relatively low dynamic surface tensions are ejected in all the scanning operations.

In the second embodiment, an ink having a relatively low dynamic surface tension is not ejected in a specific one of all the scanning operations performed on a unit region. In the following description, only ink ejection opening line 22K for the black ink and ink ejection opening line 22M for the magenta ink will be described below for the sake of simplicity.

The description of the same operations as in the first embodiment will be omitted.

In the present embodiment, an image formation in a unit region 80 on a printing medium is completed by 8 print scanning operations. The printing head 7 used in the present embodiment includes ejection opening line 22K having ejection openings through which a black ink is ejected, and ejection opening line 22M having ejection openings through which a magenta ink is ejected. In each ejection opening line, 1440 ejection openings are aligned and grouped into 8 printing groups: A1 to A8 or B1 to B8, each having 180 ejection openings.

The mask patterns used in the present embodiment will now be described in detail.

FIG. 17A shows mask patterns used for line 22K of the ejection openings through which the black ink is ejected.

FIG. 17B shows mask patterns used for line 22M of the ejection openings through which the magenta ink is ejected.

Ejection opening line 22M from printing group B1 used for the first scanning operation to printing group B8 used for the eighth scanning operation, from which the magenta ink is ejected, use mask patterns 91 to 98, respectively.

Substantially the same number of print permitting pixels are arranged in mask patterns 91 to 98.

In addition, the print permitting pixels of each of the mask patterns 91 to 98 are arranged such that the average number per print permitting pixel unit of print permitting pixels is 1.

On the other hand, ejection opening line 22K from printing group A1 used for the first scanning operation to printing group A8 used for the eighth scanning operation, from which the black ink is ejected, use mask patterns 81 to 88, respectively.

In this instance, the print permitting pixels of each of the mask patterns 81 to 86 are arranged such that the average number per print permitting pixel unit of print permitting pixels is larger than the average number per print permitting pixel unit of print permitting pixels in any of the mask patterns 91 to 98. For mask patterns 87 and 88, print permitting pixels are not assigned.

Hence, in the present embodiment, the seventh and eighth scanning operations do not eject the black ink. In this instance, a larger amount of ink can be ejected in the first to sixth scanning operations and, accordingly, the dot connectivity can be increased, in comparison with the case where inks are ejected in all the scanning operations. Thus, the rub fastness of printed images of the black ink having a relatively low dynamic surface tension can be increased.

Third Embodiment

In the first and the second embodiment, mask patterns having different dot connectivities are used according to the dynamic surface tension.

In a third embodiment, mask patterns having different dot connectivities are used according to not only the dynamic surface tension, but also the amount of ink ejected.

The description of the same operations as in the first or second embodiment will be omitted.

When an ink is ejected to a less absorbent printing medium, in practice, the ink droplets spread generally over the surface of the printing medium beyond the area of the pixel. Accordingly, when a large amount of ink is ejected, a plurality of ink droplets can join into a larger dot on the printing medium even if mask patters having low dot connectivities are used. Therefore, when a large amount of ink is ejected as in the present embodiment, the polymer emulsion can coalesce into a film sufficiently, and accordingly graininess is unlikely to increase even if an ink having a relatively low dynamic surface tension is ejected.

Accordingly, in the present embodiment, when an ink having a relatively low dynamic surface tension is ejected in an amount larger than or equal to a predetermined amount, printing is performed with a lower dot connectivity. Also, when an ink having a relatively high dynamic surface tension is ejected, or when an ink having a relatively low dynamic surface tension is ejected in an amount smaller than or equal to the predetermined amount, printing is performed with a higher dot connectivity.

Figure 18:
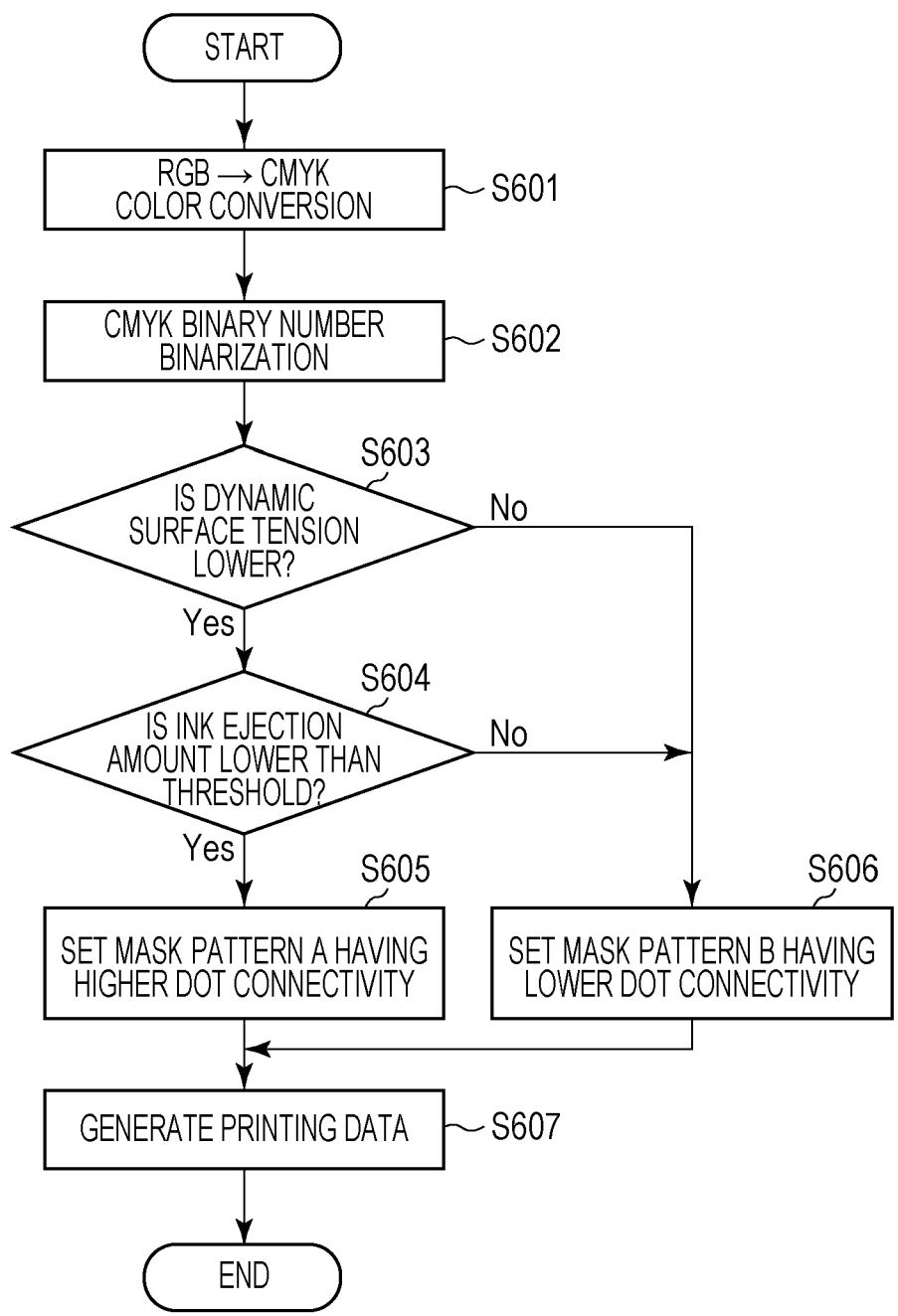
FIG. 18 is a block diagram of a data processing process in an embodiment.

FIG. 18 is a flow chart illustrating a process for processing an image in an image processing section, according to the present embodiment. In the present embodiment, the black ink is ejected to 20% of all the print permitting pixels in a unit region of a printing medium; the cyan ink, 60%; the magenta ink, 40%; and the yellow ink, 80%.

In first selection step S603, binary data corresponding to at least one ink having a relatively low dynamic surface tension is selected from the binary data produced in binarization step S602 according to the table stored in the dynamic surface tension data storage shown in FIG. 9. In the present embodiment, inks having an average dynamic surface tension $\gamma_{AVE}$ of 18.0 mN/m or less at 25° C. and a bubble lifetime of 1000 ms are selected as the ink having a relatively low dynamic surface tension, as in the first embodiment. Hence, the binary data for ejecting the black, the cyan and the yellow ink are selected as those for the ink having a relatively low dynamic surface tension, and are then transmitted to second selection step S604. On the other hand, the binary data for ejecting the magenta ink are selected as those for the ink having a relatively high dynamic surface tension and transmitted to low dot connectivity mask pattern setting step S606, and in this step, mask patterns shown in FIG. 15B are assigned.

In second selection step S604, the binary data for the black, cyan and yellow inks are compared in terms of the amount of ink to be ejected with a predetermined threshold, and binary data corresponding to an ink of an ejection amount smaller than or equal to the threshold is selected. The threshold can be appropriately set according to the absorbency of the printing medium, the wettability to the ink, and the like. In the present embodiment, the threshold is an ejection amount corresponding to 50% of all the print permitting pixels in a unit region. If the ejection amount of the black ink is smaller than the threshold, the binary data for ejecting the black ink is selected and transmitted to high dot connectivity mask pattern setting step S605, and in this step, mask patterns shown in FIG. 15A are assigned. The binary data for ejecting the cyan or the yellow ink not selected are transmitted to low dot connectivity mask pattern setting step S606, and, in this step, mask patterns shown in FIG. 15B are assigned.

In the present embodiment, since the black ink has a relatively low dynamic surface tension and is to be ejected in a small amount, the polymer emulsion in the black ink is unlikely to coalesce into a film sufficiently. Accordingly, the dot connectivity for the black ink is increased so that the degradation of the rub fastness of the printed image can be suppressed. On the other hand, the dot connectivities for the cyan ink, the magenta ink and the yellow ink, in which the polymer emulsion is likely to coalesce into a film sufficiently because of relatively high dynamic surface tension or large ejection amount, are controlled low. Consequently, the printed images exhibit fine graininess and improved rub fastness.

Fourth Embodiment

The first to third embodiments have described techniques for controlling dot connectivities of a plurality of inks in a printing apparatus using a multipass printing method, which is the printing technique of performing a plurality of scanning operations on a unit region on a printing medium.

In a fourth embodiment, the ejection order of a plurality of inks is controlled using a plurality of printing heads for each of the inks. Each printing head has a length corresponding to the width of the printing medium so that printing is performed by one print scanning operation with relative movement of the printing medium and the printing heads.

The description of the same operations as in the first to the third embodiment will be omitted.

Figure 19:
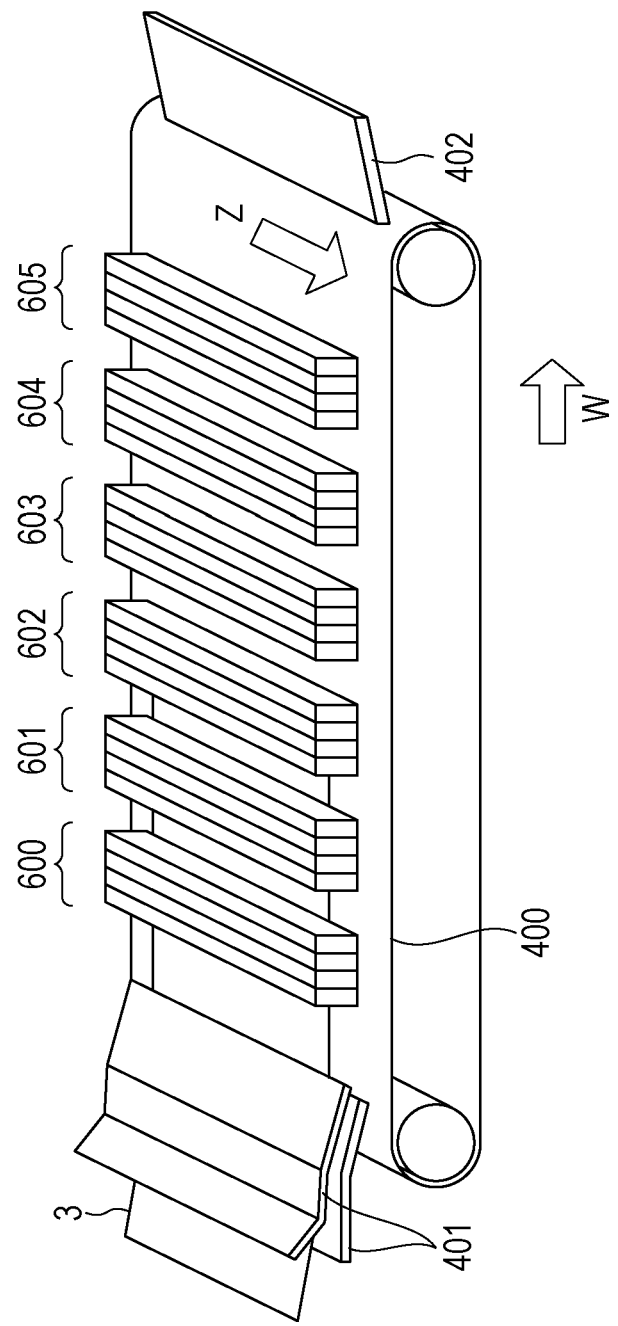
FIG. 19 is a perspective view of an image printing apparatus according to an embodiment.

FIG. 19 is a fragmentary perspective view of the internal structure of a printing apparatus according to the present embodiment.

Six printing heads 600, 601, 602, 603, 604 and 605 each have a predetermined number of ejection openings (not shown) through which a cyan ink, a magenta ink, a yellow ink and a black ink are ejected. The ejection openings are arranged in the Z direction. Hence, the number of ejection opening lines for each ink is 6. Each line of the ejection openings has a length more than or equal to the width in the Z direction of the printing medium 3 so that the printing medium 3 can be printed across the entire width thereof.

A conveying belt 400 conveys the printing medium 3. The conveying belt 400 is rotated in the W direction intersecting the Z direction by a medium feeding portion 401 and a medium ejecting portion 402.

The printing medium 3 is fed by the medium feeding portion 401 and conveyed in the W direction by the conveying belt 400.

In the present embodiment, the mask patterns shown in FIG. 15A are used for the 6 ejection opening lines for each of the black, cyan and yellow inks shown in FIG. 19, and the mask patterns shown in FIG. 15B are used to the 6 ejection opening lines for the magenta ink. More specifically, for the lines of the ejection openings, in the printing heads 600 to 605, through which the black, the cyan, or the yellow ink is ejected, the mask patterns 61 to 66 arranged in the Y direction in FIG. 15A are used in the Z direction in FIG. 19. For the lines of the ejection openings in the printing heads 600 to 605 through which the magenta ink is ejected, the mask patterns 71 to 76 shown in FIG. 15B are used in the same manner.

In the present embodiment, even in the case of using a printing apparatus that performs one print scanning operation on each unit region of a printing medium, the dot connectivity is controlled according to the dynamic surface tensions of the inks so that the rub fastness of the printed image can be increased while graininess is minimized.

In addition, since image formation can be completed by only one print scanning operation, printing time can be reduced accordingly.

While the present embodiment uses a printing head having long ejection opening lines having a length in the Z direction corresponding to the width of the printing medium, printing heads having short ejection opening lines may be aligned in the Z direction to form a long line of ejection openings.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Although, in the above-described embodiments, the inks are classified into two groups according to the dynamic surface tensions of the inks for selecting mask patters having suitable dot connectivities for each ink group, other methods may be applied. For example, other mask patterns having a still higher dot connectivity may be used, and the inks are classified into three groups according to the dynamic surface tensions of the inks for selecting mask patters having suitable dot connectivities for each ink group.

Although color inks are used in the above-described embodiments, all the inks need not be colored. For example, in an embodiment, an achromic ink have a lower dynamic surface tension and a color ink have a higher dynamic surface tension may be used. In this instance, the dot connectivity for the achromic ink is set to be higher, and the dot connectivity for the color ink is set to be lower.

Although the above-described first to fourth embodiments use mask patterns for controlling the dot connectivity, any other technique may be applied, without limitation to using mask patterns, as long as printing is performed for each pixel. For example, for each line of pixels aligned in the X direction, a distribution circuit may sequentially distribute printing data to a plurality of buffers corresponding to a plurality of print scanning operations, and it may be determined what scanning operation is applied for printing the pixels.

For printing an image with an ink containing a polymer emulsion and a water-soluble organic solvent and having a relatively low dynamic surface tension, the image processing apparatus, the image processing method and the image printing apparatus of any embodiment of the application allow printing capable of reducing the graininess of the printed image and minimizing the degradation of the rub fastness of the image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-206787, filed Oct. 1, 2013, which is hereby incorporated by reference herein in its entirety.

What is claimed is:

1. An image processing apparatus configured to generate printing data for a printing head to eject a plurality of inks to a plurality of pixel areas, corresponding to pixels, in a unit region on a printing medium by a plurality of relative scanning operations, the plurality of inks including a first color ink containing a pigment, a polymer emulsion and a water-soluble organic solvent, and a second color ink containing a pigment, a polymer emulsion and a water-soluble organic solvent and having a lower dynamic surface tension than the first color ink at a predetermined bubble lifetime, the image processing apparatus comprising:
an image data obtaining unit configured to obtain first image data determining, for each of the pixel areas, whether or not the first color ink is ejected to the pixel area, and second image data determining, for each of the pixel areas, whether or not the second color ink is ejected to the pixel area; and
a printing data generator configured to generate a plurality of first printing data, corresponding to the plurality of scanning operations and being used for printing performed by the corresponding scanning operation, from the first image data according to a plurality of first mask patterns in which print permitting pixels and print non-permitting pixels are arranged, and a plurality of second printing data, corresponding to the plurality of scanning operations and being used for printing performed by the corresponding scanning operation, from the second image data according to a plurality of second mask patterns in which print permitting pixels and print non-permitting pixel are arranged,
wherein the print permitting pixels in each mask pattern define at least one print permitting pixel unit consisting of a plurality of print permitting pixels adjoining each other or a single print permitting pixel not adjoining other print permitting pixels, and the average number per print permitting pixel unit of the print permitting pixels in one of the second mask patterns is larger than the average number per print permitting pixel unit of the print permitting pixels in one of the first mask patterns.

2. The image processing apparatus according to claim 1, wherein the average number per print permitting pixel unit of the print permitting pixels in each of the second mask patterns is larger than the average number per print permitting pixel unit of the print permitting pixels in any of the first mask patterns.

3. The image processing apparatus according to claim 1, wherein the dynamic surface tension of the second color ink is lower than the dynamic surface tension of the first color ink at 25° C. and the predetermined bubble lifetime.

4. The image processing apparatus according to claim 1, wherein the predetermined bubble lifetime is 1000 ms.

5. The image processing apparatus according to claim 1, wherein the dynamic surface tensions of the first and the second color ink are measured by a maximum bubble pressure method.

6. The image processing apparatus according to claim 1, wherein the polymer emulsion coalesces into a film when being heated.

7. The image processing apparatus according to claim 6, wherein each of the water-soluble organic solvents reduces the minimum film forming temperature of the corresponding polymer emulsion.

8. The image processing apparatus according to claim 7, wherein the water-soluble organic solvents are 2-pyrrolidone.

9. The image processing apparatus according to claim 7, wherein the content of the water-soluble organic solvent in the first color ink is different from the content of the water-soluble organic solvent in the second color ink.

10. The image processing apparatus according to claim 1, wherein the printing medium includes a substrate and a polyvinyl chloride layer on the substrate.

11. The image processing apparatus according to claim 1, wherein the plurality of inks include a third color ink containing a pigment, a polymer emulsion and a water-soluble organic solvent, and having a lower dynamic surface tension than the second color ink at the predetermined bubble lifetime, wherein the image data obtaining unit obtains third image data determining, for each of the pixel areas, whether or not the third color ink is ejected to the pixel area, and the printing data generator generates a plurality of third printing data, each corresponding to any of the plurality of scanning operations and being used for printing performed by the corresponding scanning operation, from the third image data according to a plurality of third mask patterns in which print permitting pixels and print non-permitting pixels are arranged, and wherein the average number per print permitting pixel unit of the print permitting pixels in one of the third mask patterns is larger than the average number per print permitting pixel unit of the print permitting pixels in one of the second mask patterns.

12. The image processing apparatus according to claim 1, wherein the number of the print permitting pixels in each of the second mask patterns is substantially equal to the number of the print permitting pixels in each of the first mask patterns.

13. The image processing apparatus according to claim 1, wherein at least one of the second mask patterns has no print permitting pixel.

14. An image processing apparatus configured to generate printing data for a printing head to eject a plurality of inks to a plurality of pixel areas, corresponding to pixels, in a unit region on a printing medium by a plurality of relative scanning operations, the plurality of inks including a first color ink containing a pigment, a polymer emulsion and a water-soluble organic solvent, and a second color ink containing a pigment, a polymer emulsion and a water-soluble organic solvent and having a lower dynamic surface tension than the first color ink at a predetermined bubble lifetime, the image processing apparatus comprising:
a first obtaining unit configured to obtain first image data determining, for each of the pixel areas, whether or not the first color ink is ejected to the pixel area, and second image data determining, for each of the pixel areas, whether or not the second color ink is ejected to the pixel area;
a second obtaining unit configured to obtain the amount of the second color ink to be ejected to the unit region; and
a printing data generator configured to generate a plurality of first printing data, corresponding to the plurality of scanning operations and being used for printing performed by the corresponding scanning operation, from the first image data according to a plurality of first mask patterns in which print permitting pixels and print non-permitting pixels are arranged, and a plurality of second printing data, corresponding to the plurality of scanning operations and being used for printing performed by the corresponding scanning operation, from the second image data according to a plurality of second mask patterns or a plurality of third mask patterns, the second and third mask patterns including print permitting pixels and print non-permitting pixels arranged therein, wherein the print permitting pixels in each mask pattern define at least one print permitting pixel unit consisting of a plurality of print permitting pixels adjoining each other or a single print permitting pixel not adjoining other print permitting pixels, and the average number per print permitting pixel unit of the print permitting pixels in one of the second mask patterns is larger than the average number per print permitting pixel unit of the print permitting pixels in one of the first mask patterns and the average number per print permitting pixel unit of the print permitting pixels in one of the third mask patterns, and wherein the printing data generator generates: (i) second printing data according to the third mask patterns in a case that the ejection amount of the second color ink obtained by the second obtaining unit is a first amount; and (ii) second printing data according to the second mask patterns in a case that the ejection amount of the second color ink obtained by the second obtaining unit is a second amount smaller than the first amount.

15. An image processing apparatus configured to generate printing data for a printing head to eject a plurality of inks to a plurality of pixel areas, corresponding to pixels, in a unit region on a printing medium by a plurality of scanning operations, the plurality of inks including a first color ink containing a pigment, a polymer emulsion and a water-soluble organic solvent, and a second color ink containing a pigment, a polymer emulsion and a water-soluble organic solvent and having a lower dynamic surface tension than the first color ink at a predetermined bubble lifetime, the image processing apparatus comprising:

an image data obtaining unit configured to obtain first image data determining, for each of the pixel areas, whether or not the first color ink is ejected to the pixel area, and second image data determining, for each of the pixel areas, whether or not the second color ink is ejected to the pixel area, and a printing data generator configured to generate a plurality of first printing data, corresponding to the plurality of scanning operations and being used for printing performed by the corresponding scanning operation, from the first image data according to a plurality of first mask patterns in which print permitting pixels and print non-permitting pixels are arranged, and a plurality of second printing data, corresponding to the plurality of scanning operations and being used for printing performed by the corresponding scanning operation, from the second image data according to a plurality of second mask patterns in which print permitting pixels and print non-permitting pixel are arranged, wherein the degree of dispersion in distribution of the print permitting pixels in one of the second mask patterns is lower than the degree of dispersion in distribution of the print permitting pixels in one of the first mask patterns.

16. An image printing apparatus configured to print an image, the image printing apparatus comprising:

a printing head configured to eject a plurality of inks including a first color ink containing a pigment, a polymer emulsion and a water-soluble organic solvent, and a second color ink containing a pigment, a polymer emulsion and a water-soluble organic solvent and having a lower dynamic surface tension than the first color ink at a predetermined bubble lifetime;

a scanning unit configured to cause the printing head to perform a plurality of relative scanning operations on a unit region of a printing medium in a scanning direction; and a controller configured to control the ejection with the scanning operation of the first and the second color ink from the printing head to the unit region so that the connectivity of dots of the second color ink formed in the unit region by a predetermined one of the scanning operations is larger than the connectivity of dots of the first color ink formed in the unit region by the predetermined scanning operation.

17. The image printing apparatus according to claim 16, wherein each of the polymer emulsions coalesces into a film when being heated.

18. The image printing apparatus according to claim 17, wherein each of the water-soluble organic solvents reduces the minimum film forming temperature of the corresponding polymer emulsion.

19. The image printing apparatus according to claim 18, wherein the water-soluble organic solvents are 2-pyrrolidone.

20. The image printing apparatus according to claim 16, wherein the plurality of inks include a third color ink containing a pigment, a polymer emulsion and a water-soluble organic solvent, and having a lower dynamic surface tension than the second color ink at a predetermined bubble lifetime, and the controller controls the ejection of the second and the third color ink so that the connectivity of dots of the third color ink formed in the unit region by the predetermined scanning operation is larger than the connectivity of dots of the second color ink formed in the unit region by the predetermined scanning operation.

21. An image processing method for generating printing data for a printing head to eject a plurality of inks to a plurality of pixel area, corresponding to pixels, in a unit region on a printing medium by a plurality of scanning operations, the plurality of inks including a first color ink containing a pigment, a polymer emulsion and a water-soluble organic solvent, and a second color ink containing a pigment, a polymer emulsion and a water-soluble organic solvent and having a lower dynamic surface tension than the first color ink at a predetermined bubble lifetime, the image processing method comprising:

obtaining first image data determining, for each of the pixel areas, whether or not the first color ink is ejected to the pixel area, and second image data determining, for each of the pixel areas, whether or not the second color ink is ejected to the pixel area, and generating a plurality of first printing data, corresponding to the plurality of scanning operations and being used for printing performed by the corresponding scanning operation, from the first image data according to a plurality of first mask patterns in which print permitting pixels and print non-permitting pixels are arranged, and a plurality of second printing data, corresponding to the plurality of scanning operations and being used for printing performed by the corresponding scanning operation, from the second image data according to a plurality of second mask patterns in which print permitting pixels and print non-permitting pixel are arranged, wherein the print permitting pixels in each mask pattern define at least one print permitting pixel unit consisting of a plurality of print permitting pixels adjoining each other or a single print permitting pixel not adjoining other print permitting pixels, and the average number per print permitting pixel unit of the print permitting pixels in one of the second mask patterns is larger than the average number per print permitting pixel unit of the print permitting pixels in one of the first mask patterns.

* * * * *